(12) United States Patent
Gaughan et al.

(10) Patent No.: US 10,906,570 B2
(45) Date of Patent: Feb. 2, 2021

(54) PARKING BRAKE CONTROL

(71) Applicant: Westinghouse Air Brake Technologies Corporation, Wilmerding, PA (US)

(72) Inventors: Edward W. Gaughan, Greensburg, PA (US); William John Potter, Trafford, PA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 169 days.

(21) Appl. No.: 16/076,412

(22) PCT Filed: Mar. 2, 2017

(86) PCT No.: PCT/US2017/020346
§ 371 (c)(1),
(2) Date: Aug. 8, 2018

(87) PCT Pub. No.: WO2017/151854
PCT Pub. Date: Sep. 8, 2017

(65) Prior Publication Data
US 2019/0054935 A1   Feb. 21, 2019

Related U.S. Application Data

(60) Provisional application No. 62/302,999, filed on Mar. 3, 2016.

(51) Int. Cl.
*B60T 13/66* (2006.01)
*B61H 13/34* (2006.01)
(Continued)

(52) U.S. Cl.
CPC ............ *B61H 13/34* (2013.01); *B60T 13/385* (2013.01); *B60T 13/665* (2013.01); *B60T 13/683* (2013.01);
(Continued)

(58) Field of Classification Search
CPC .... B60T 8/1705; B60T 13/385; B60T 15/041; B61H 13/005; B61H 13/02
See application file for complete search history.

(56) References Cited

U.S. PATENT DOCUMENTS 3,895,695 A * 7/1975 Hunter ................. B60T 13/261
188/170
4,125,128 A * 11/1978 Elward ................ B60T 17/043
137/596

(Continued)

FOREIGN PATENT DOCUMENTS

EP  2165902 B1  9/2011

*Primary Examiner* — Bradley T King
(74) *Attorney, Agent, or Firm* — Christopher R. Carroll; The Small Patent Law Group LLC

(57) ABSTRACT

A parking brake control module using pneumatic logic to control a parking brake on a vehicle. The control module includes a brake pipe passageway, a reservoir passageway, a reservoir release valve; and an actuation cylinder vent valve. The control module applies or releases the parking brake based on pressures of the brake pipe and reservoir. A method uses pneumatic logic to control a parking brake on a vehicle. The parking brake is applied when the brake pipe pressure falls below a lower brake pipe pressure threshold and is released when the brake pipe pressure exceeds an upper brake pipe pressure threshold and the reservoir pressure exceeds a reservoir pressure threshold. A hold valve can allow an operator to manually prevent the release of the parking brake.

25 Claims, 21 Drawing Sheets

(51) Int. Cl.
 *B61H 13/20* (2006.01)
 *B60T 17/22* (2006.01)
 *B61H 13/38* (2006.01)
 *B60T 13/38* (2006.01)
 *B60T 13/68* (2006.01)
 *B61H 13/02* (2006.01)

(52) U.S. Cl.
 CPC ............ *B60T 17/228* (2013.01); *B61H 13/02* (2013.01); *B61H 13/20* (2013.01); *B61H 13/38* (2013.01)

(56) References Cited

U.S. PATENT DOCUMENTS

| | | | |
|---|---|---|---|
| 4,564,245 | A | 1/1986 | Barberis |
| 5,558,411 | A * | 9/1996 | Kanjo ..................... B60T 7/18 188/170 |
| 6,161,582 | A * | 12/2000 | Asano .................. F16K 5/0605 137/625.21 |
| 6,854,570 | B2 | 2/2005 | Connell |
| 8,469,464 | B2 | 6/2013 | Sommerfeld et al. |
| 8,794,717 | B2 * | 8/2014 | Call ....................... B61H 13/02 303/36 |
| 2001/0050027 | A1 | 12/2001 | Engle |
| 2002/0180264 | A1* | 12/2002 | Moffitt ................. B60T 13/665 303/128 |
| 2016/0023645 | A1* | 1/2016 | Wright ................. B60T 15/184 303/66 |
| 2016/0082939 | A1* | 3/2016 | Cole .................... B60T 13/665 303/8 |

\* cited by examiner

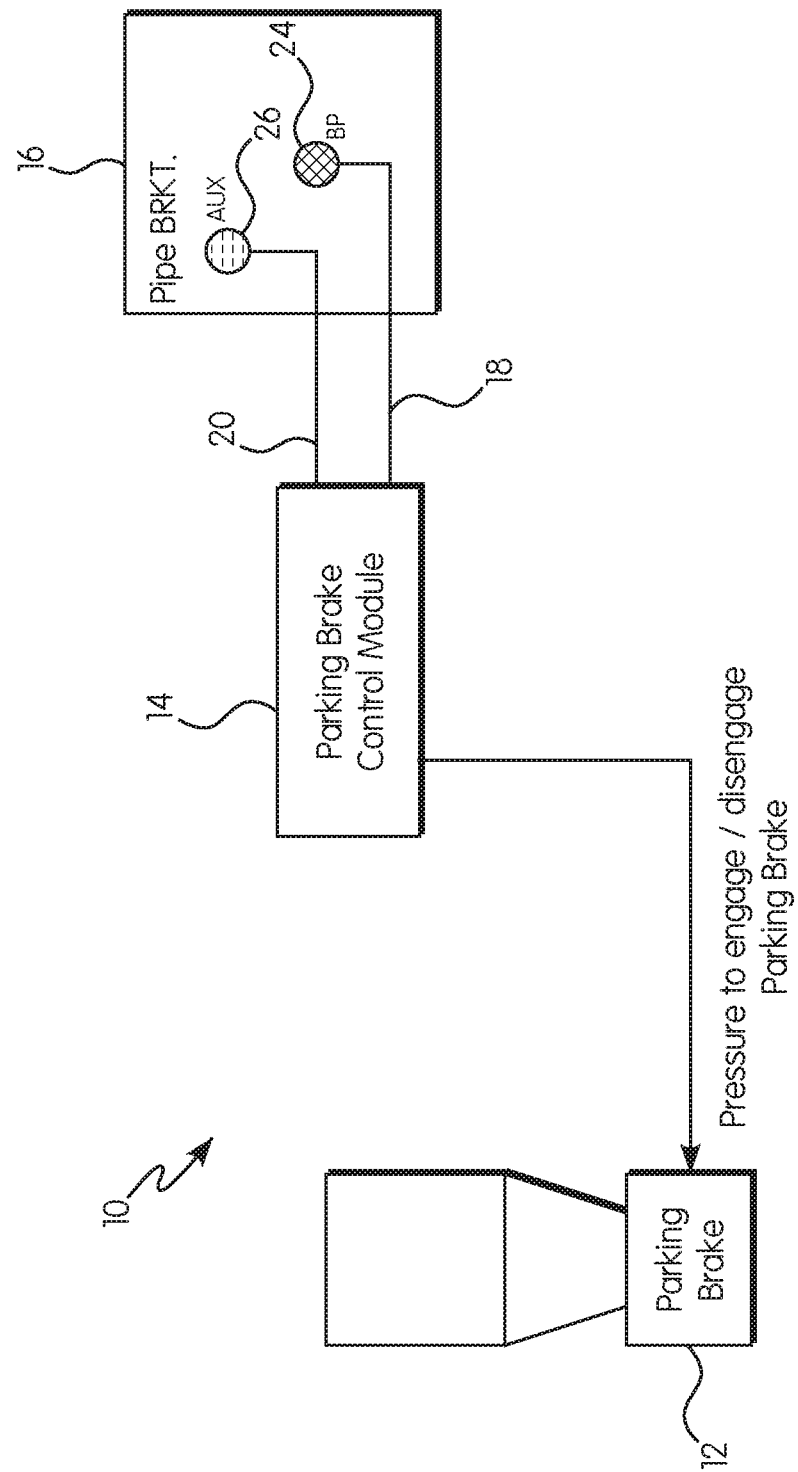

Section C-C

LEGEND
⊗ Brake Pipe Pressure
⊖ Reservoir Pressure
⊕ Parking Brake Pressure

Partial Service
BP > 40-psi
AUX > 55-psi

Section C-C

Full Service
BP > 40-psi
AUX < 55-psi

Section C-C

Emergency
BP < 20-psi
AUX > 55-psi

Section C-C

Section C-C

Section C-C

BP Charging
BP > 40-psi
AUX < 55-psi

Section C-C

Parking Brake Release
BP > 40-psi
AUX > 55-psi

Section C-C

Entire System Vented - Parking Brake Applied

Brake Pipe Exhausted
Brake Pipe Below Lower Threshold
Reservoir Above Threshold
Parking Brake Applied Hold Valve Switched to Hold Position
System Charged – Parking Brake Applied

PARKING BRAKE CONTROL

CROSS-REFERENCE TO RELATED APPLICATION

This application claims priority to U.S. Provisional Patent Application No. 62/302,999 filed Mar. 3, 2016, the disclosure of which is hereby incorporated in its entirety by reference.

BACKGROUND OF THE INVENTION

Field of the Invention

The present invention relates to a parking brake control module using pneumatic logic to control both the application and the release of a parking brake for railway cars.

Description of Related Art

When a railway car or a chain of railway cars are parked, a parking brake can be applied to prevent the cars from unwanted movements. Presently, the parking brake is applied using a manual crank handbrake that mechanically applies force to the brake rigging. This requires an operator applying the manual crank handbrake to do so properly and to release the handbrake at the desired time, before the cars are used again.

Railway cars have a brake pipe that extends the length of each car and is coupled to the brake pipe of other railway cars so that the brake pipe runs the entire length of a train. The brake pipe is charged with compressed air by a locomotive. The compressed air of the brake pipe charges reservoirs on each car (supply, auxiliary, or emergency) that provides pneumatic brake force at each car.

SUMMARY OF THE INVENTION

According to one embodiment of the invention, a parking brake control module using pneumatic logic to control a parking brake includes a brake pipe passageway, a reservoir passageway, a reservoir release valve, and an actuation cylinder vent valve. The brake pipe passageway is for the flow of brake pipe pressure, while the reservoir passageway is for the flow of reservoir pressure. The reservoir release valve is in fluid communication with the brake pipe passageway. The actuation cylinder vent valve is in fluid communication with the reservoir release valve. The parking brake is applied using the parking brake control module when brake pipe pressure falls to or below a lower brake pipe pressure threshold. The parking brake is released using the parking brake control module when the brake pipe pressure is above an upper brake pipe pressure threshold and a reservoir pressure is above a reservoir pressure threshold.

In a further embodiment of the invention, a system for controlling a parking brake includes a pipe bracket, a parking brake control module, a brake pipe passageway, a reservoir passageway, and a parking brake. The pipe bracket includes a brake pipe port and a reservoir port. The brake pipe passageway carries brake pipe pressure and runs from the brake pipe port to the parking brake control module. The reservoir passageway carries reservoir pressure and runs from the reservoir port to the parking brake control module. The parking brake is in fluid communication with the parking brake control module.

In a further embodiment of the invention, a method using pneumatic logic to control a parking brake includes flowing brake pipe pressure into a parking brake control module via a brake pipe passageway and flowing reservoir pressure into a parking brake control module via a reservoir passageway. In the method, the parking brake is applied when the brake pipe pressure falls to or below a lower brake pipe pressure threshold. The parking brake is released when the brake pipe pressure is above an upper brake pipe pressure threshold and a reservoir pressure is above a reservoir pressure threshold.

In a further embodiment of the invention, a system for controlling a parking brake includes a brake pipe passageway through which brake pipe pressure flows, a parking brake, and a hold valve. The hold valve has a first position and a second position. In the first position, the hold valve directs brake pipe pressure to the parking brake, and in the second position, the hold valve prevents brake pipe pressure from flowing to the parking brake.

From the foregoing disclosure and the following more detailed description, it will be apparent to those skilled in the art that the present invention provides a significant advance in the technology and art of controlling the application and release of a parking brake in a railway car.

BRIEF DESCRIPTION OF THE DRAWINGS

FIG. 1 is a schematic view of one embodiment of a parking brake system;

DETAILED DESCRIPTION OF THE INVENTION

Figure 2A:
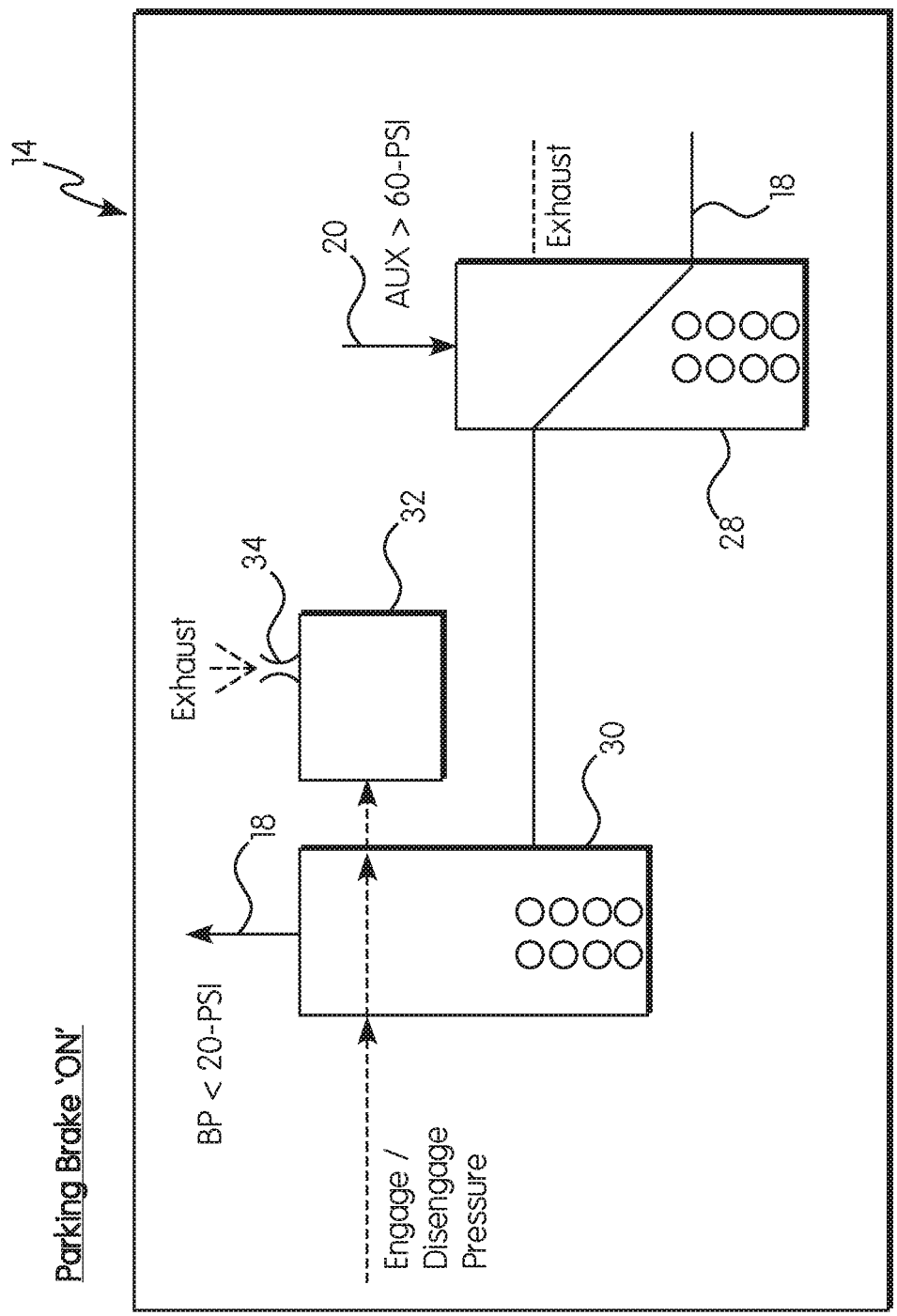
FIG. 2A is a schematic view of one embodiment of a parking brake control module showing the control logic to apply the parking brake.

It will be apparent to those skilled in the art that many uses and design variations are possible for the parking brake control module disclosed herein. The following detailed discussion of various alternative and preferred embodiments will illustrate general principles of the invention, but other embodiments and variations will be apparent to those skilled in the art given the benefit of this disclosure.

Referring to FIG. 1, a parking brake system 10, according to one embodiment, includes a parking brake 12, a parking brake control module 14, a pipe bracket 16, a brake pipe passageway 18, and a reservoir passageway 20. The parking brake 12 includes a parking brake cylinder 22 (shown in FIGS. 4-8) that maintains a force output of the brake application by locking a brake rigging in an applied state. When there is no pressure in the parking brake cylinder 22 (e.g., pressure is equal to atmospheric pressure), the parking brake 12 is applied. Flowing compressed air to fill the parking brake cylinder 22 (adding parking brake pressure) causes the release of the parking brake 12.

The parking brake system 10 includes the pipe bracket 16 that includes a brake pipe port 24 and a reservoir port 26. The brake pipe passageway 18 runs from the brake pipe port 24 of the pipe bracket 16 to the parking brake control module 14 to carry brake pipe pressure to the parking brake control module 14. The reservoir passageway 20 runs from the reservoir port 26 of the pipe bracket 16 to the parking brake control module 14 to carry reservoir pressure to the parking brake control module 14. In one embodiment, the reservoir pressure carried to the parking brake control module 14 is auxiliary reservoir pressure. In another embodiment, the reservoir pressure carried to the parking brake control module 14 is supply reservoir pressure. In another embodiment, the reservoir pressure carried to the parking brake control module 14 is emergency reservoir pressure.

Figure 2B:
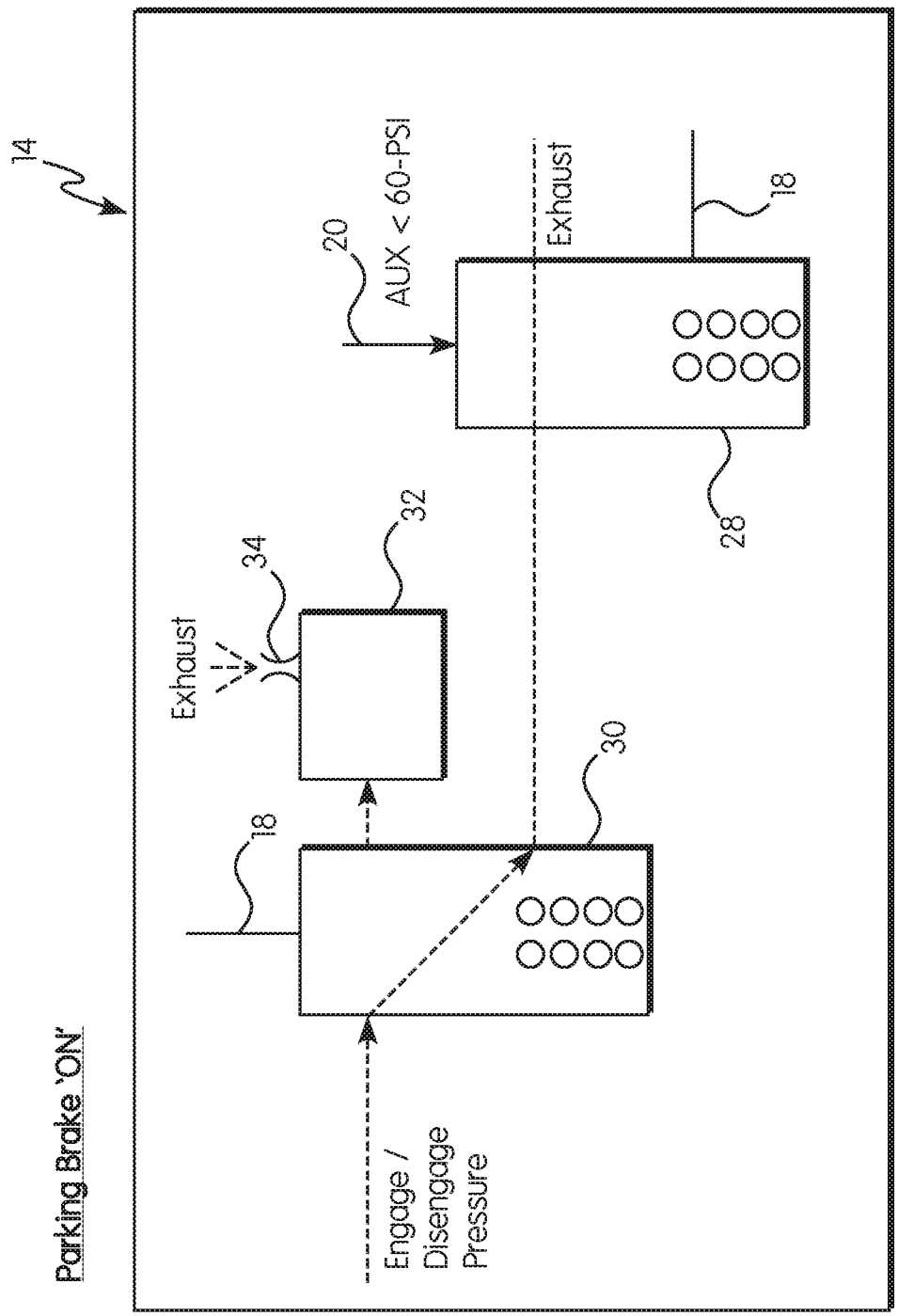
FIG. 2B is a schematic view of one embodiment of a parking brake control module showing the control logic to keep the parking brake applied with reservoir pressure below the predetermined threshold pressure.
Figure 3:
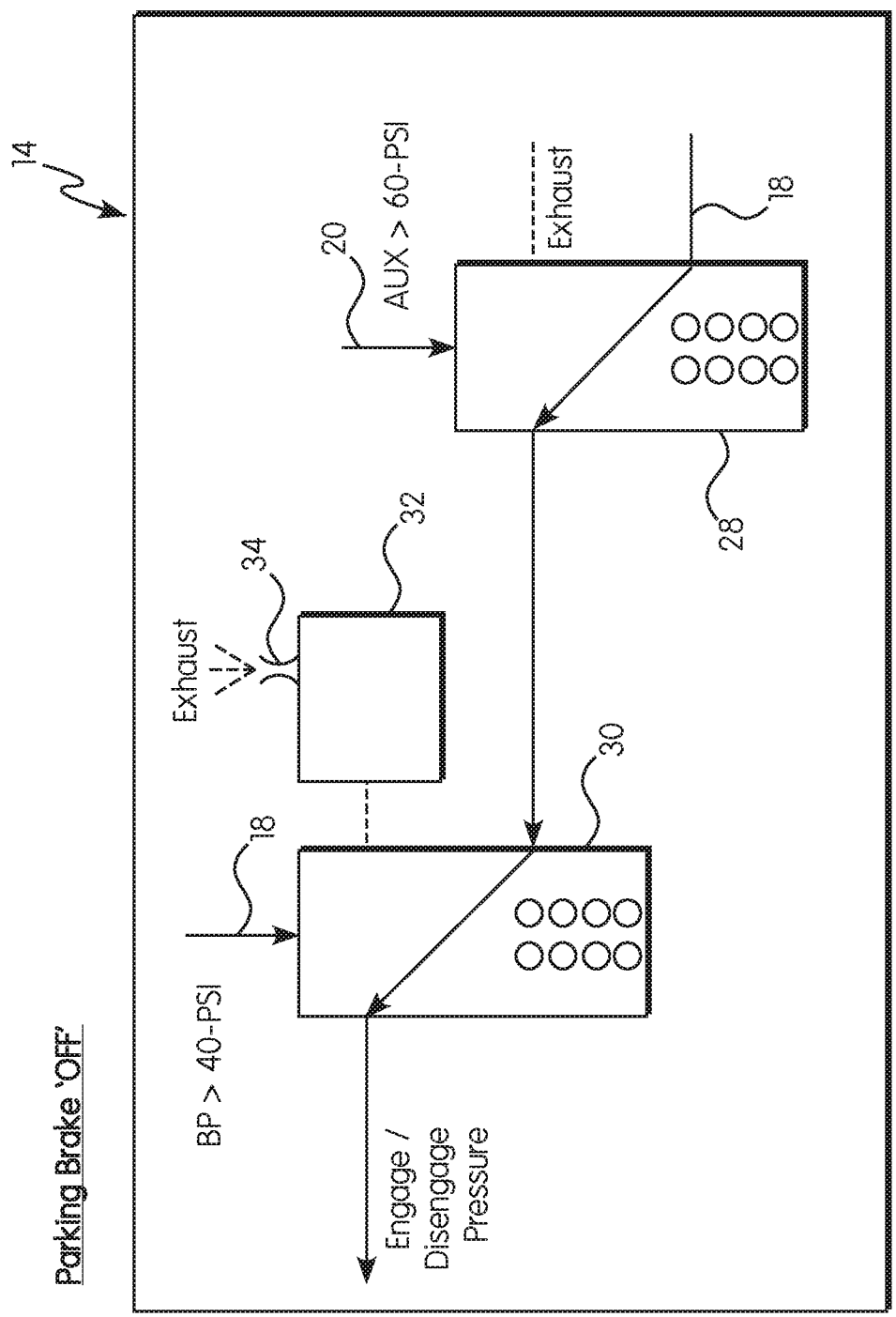
FIG. 3 is a schematic view of one embodiment of a parking brake control module showing the control logic to release the parking brake.

Referring to FIG. 2A, FIG. 2B and FIG. 3, the parking brake control module 14 includes the brake pipe passageway 18, the reservoir passageway 20, a reservoir release valve 28, an actuation cylinder vent valve 30, a timing volume 32, and an exhaust 34. The reservoir release valve 28 is a valve to prevent the introduction of brake pipe pressure to the parking brake cylinder 22 until reservoir pressure increases to above a predetermined level (a reservoir pressure threshold). The actuation cylinder vent valve 30 provides independent venting of the parking brake cylinder 22, which applies the parking brake 12. The actuation cylinder vent valve 30 may be a diaphragm actuated spool valve, although other suitable valve arrangements may be utilized.

FIG. 2A shows the control logic for the application of the parking brake 12. In FIG. 2A, the brake pipe pressure is below the lower brake pipe pressure threshold; the reservoir pressure is above the reservoir pressure threshold. FIG. 2B also shows the control logic for the application of the parking brake 12. In FIG. 2B, the reservoir pressure is not above the reservoir pressure threshold, preventing the brake pipe pressure to the parking brake. FIG. 3 shows the control logic for the release of the parking brake 12. In FIG. 2A, the brake pipe pressure is above the upper brake pipe pressure threshold, and the reservoir pressure is above the reservoir pressure threshold.

The parking brake control module 14 is in fluid communication with the brake pipe via the brake pipe passageway 18 and the brake pipe port 24, and is in fluid communication with the reservoir via the reservoir passageway 20 and the reservoir port 26.

The reservoir release valve 28 includes a first position and a second position. In the first position, brake pipe pressure is prevented from flowing to the actuation cylinder vent valve 30. In the second position, brake pipe pressure flows through the reservoir release valve 28 to the actuation cylinder vent valve 30. The reservoir release valve 28 uses a spring-biased diaphragm that will move based on pressures acting against the diaphragm. In the case of the reservoir release valve 28, the reservoir pressure acts against the diaphragm. When the reservoir pressure is at or below a reservoir pressure threshold, the reservoir release valve 28 is in position one. The reservoir release valve 28 moves to the second position when the reservoir pressure exceeds the reservoir pressure threshold.

The actuation cylinder vent valve 30 includes a first position and a second position. In the first position, air pressure from the parking brake cylinder 22 is directed through the timing volume 32 to the exhaust 34. In the second position, air pressure from the parking brake cylinder 22 is prevented from flowing to the exhaust 34. The actuation cylinder vent valve 30 also uses a spring-biased diaphragm. In the case of the actuation cylinder vent valve 30, the brake pipe pressure acts against the diaphragm. When the brake pipe pressure is at or below a lower brake pipe pressure threshold, the actuation cylinder vent valve 30 is in the first position. The actuation cylinder vent valve 30 moves to the second position when the brake pipe pressure exceeds the lower brake pipe pressure threshold.

If the brake pipe pressure drops below a lower brake pipe pressure threshold, the parking brake 12 is applied (as shown in FIG. 2A). In this case, brake pipe pressure does not flow through the actuation cylinder vent valve 30 to the parking brake cylinder 22 because the actuation cylinder vent valve 30 is moved to position one. In position one, the parking brake pressure in the parking brake cylinder 22 vents by being directed to the timing volume 32 and then vented to the atmosphere through the exhaust 34. This drop in parking brake pressure causes the parking brake 12 to be applied. The timing volume 32 is a space located between the parking brake cylinder 22 and the exhaust 34 that fills with the parking brake pressure during venting. The timing volume 32 fills with the parking brake pressure before escaping to the atmosphere through the exhaust 34, which delays the pressure decrease to the parking brake 12 to allow for the brake application to stabilize during an emergency brake application.

The parking brake 12 is not released until both the reservoir pressure exceeds the reservoir pressure threshold and the brake pipe pressure exceeds the upper brake pipe pressure threshold. When reservoir pressure is below a pre-determined threshold, brake pipe pressure is prevented from flowing to the parking brake (as shown in FIG. 2B). This is to ensure that the brake system of the rail car achieves a state of charge to allow sufficient pressure to be available to apply braking capability upon the release of the parking brake 12.

In one embodiment of the invention, the reservoir pressure threshold is 55 psi, the upper brake pipe pressure threshold is 40 psi, and the lower brake pipe pressure threshold is 20 psi. In another embodiment of the invention, the reservoir pressure threshold is 60 psi, the upper brake pipe pressure threshold is 40 psi, and the lower brake pipe pressure threshold is 20 psi. In this embodiment of the invention, the pneumatic logic applied by the parking brake control module 14 will provide a sufficient level of charge in the brake pipe to allow an emergency venting of brake pipe pressure to transmit through the train. The reservoir pressure requirement will provide sufficient charge to produce the equivalent brake cylinder pressure of a full service brake application. In some embodiments, this pressure is approximately 50 psi of pressure to the brake cylinder.

FIGS. 4-8 show schematic views of the parking brake system 10 for several illustrative scenarios.

Figure 4:
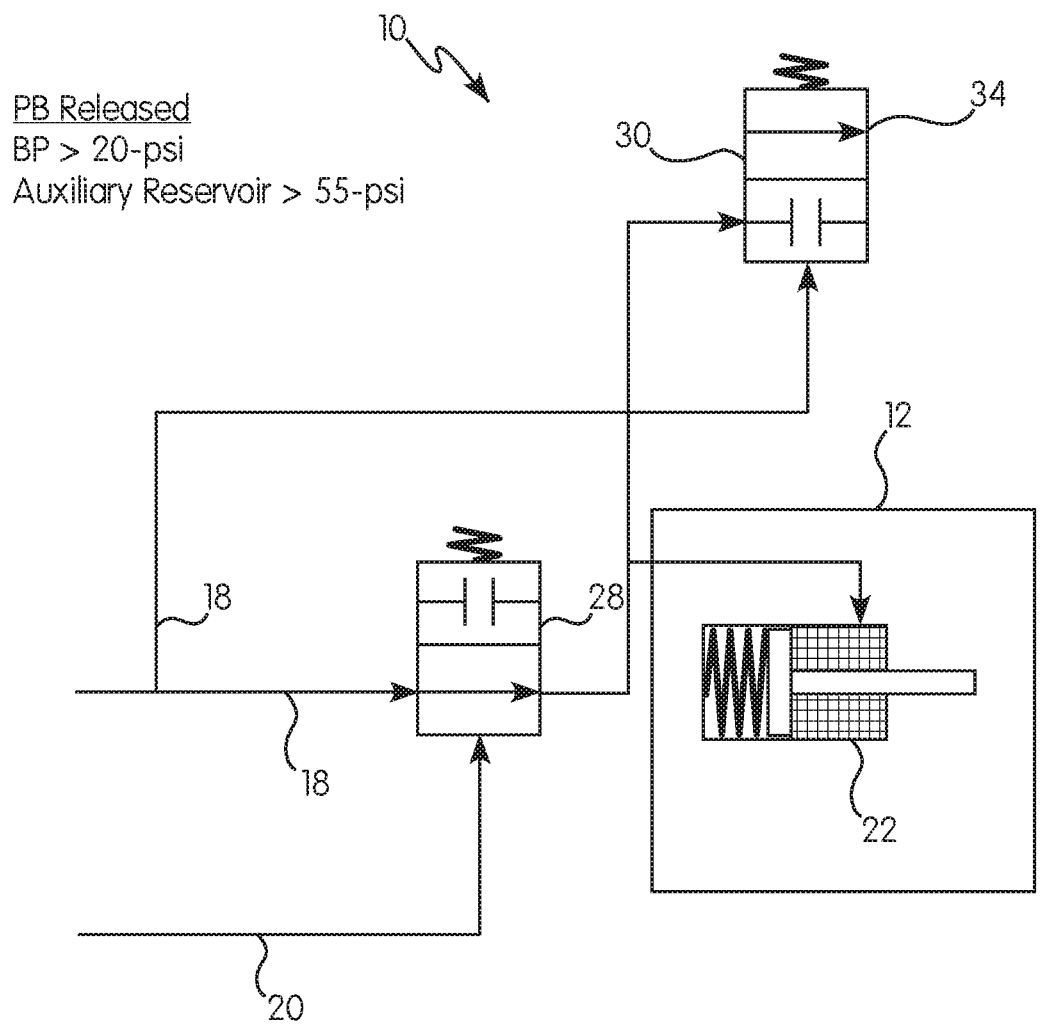
FIG. 4 is a schematic view of one embodiment of a parking brake system showing the parking brake released.

FIG. 4 shows a scenario of the parking brake system 10 with the parking brake 12 released. The reservoir pressure exceeds the reservoir pressure threshold. Since the reservoir pressure exceeds the reservoir pressure threshold, the reservoir release valve 28 is in position two so that brake pipe pressure is directed to the actuation cylinder vent valve 30. There is sufficient brake pipe pressure in this scenario so that the actuation cylinder vent valve 30 is in position two so that brake pipe pressure is directed to the parking brake cylinder 22. This causes the parking brake pressure in the parking brake cylinder 22 to rise to the brake pipe pressure. Since there is sufficient brake pipe pressure and reservoir pressure, the parking brake 12 is released in this scenario.

Figure 5:
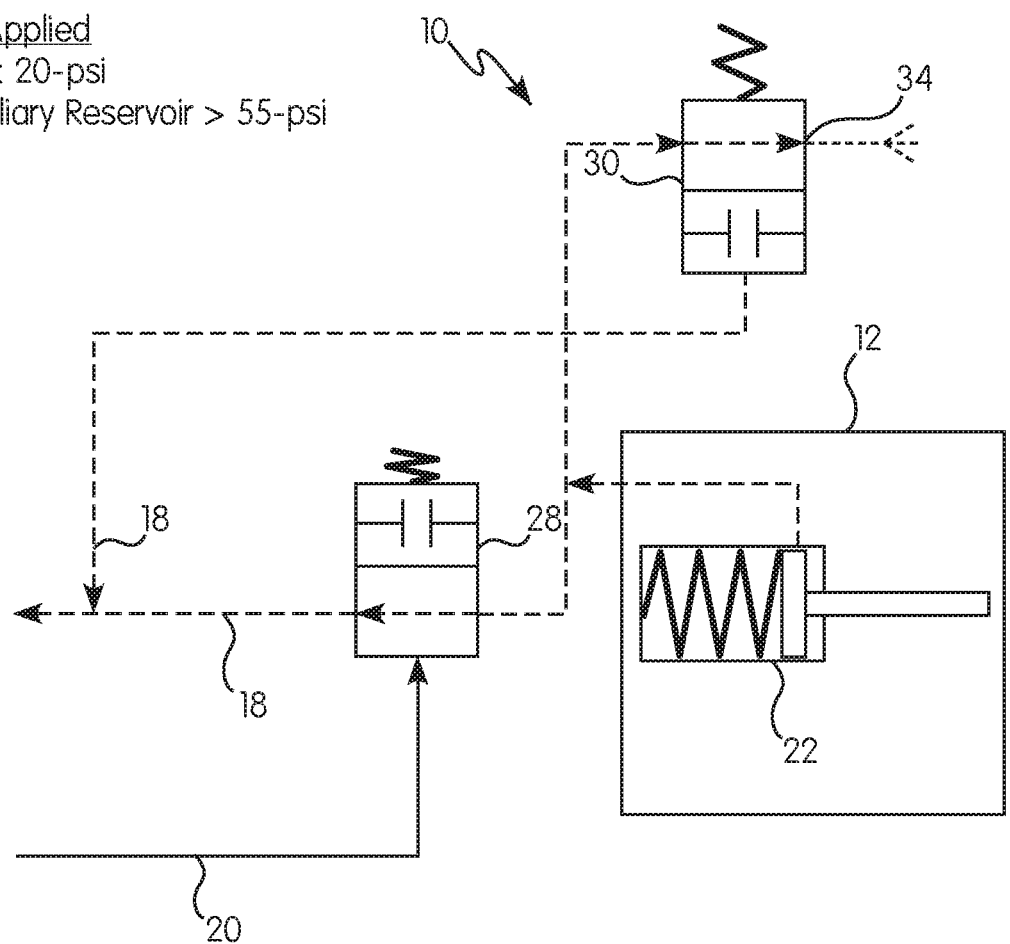
FIG. 5 is a schematic view of one embodiment of a parking brake system showing the parking brake applied.

FIG. 5 shows a scenario of the parking brake system 10 with the parking brake 12 applied. The parking brake pressure is vented through the timing volume 32 and the exhaust 34 since the brake pipe pressure falls below the lower brake pipe pressure threshold. The drop in parking brake pressure causes the application of the parking brake 12. The parking brake 12 will apply in this scenario even with the reservoir pressure exceeding the reservoir pressure threshold.

Figure 6:
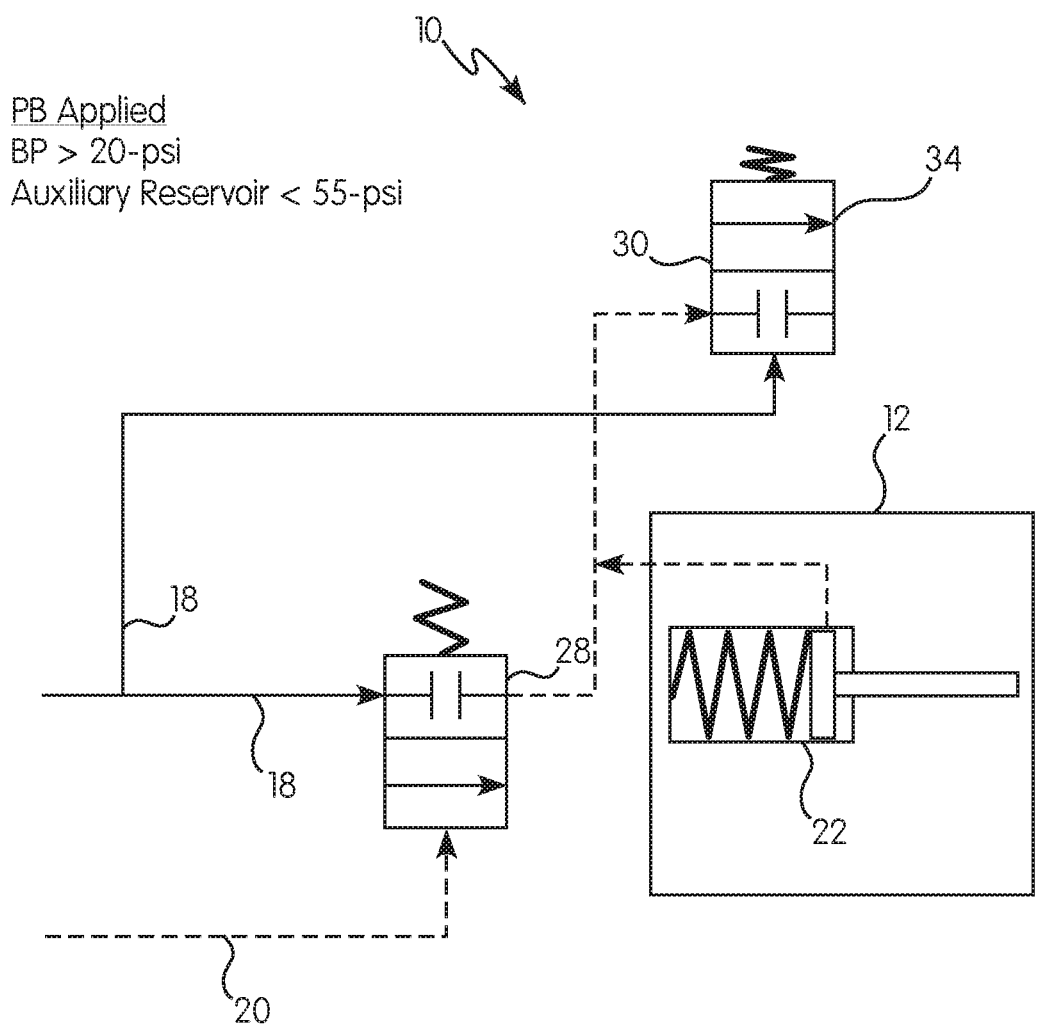
FIG. 6 is a schematic view of one embodiment of a parking brake system showing the parking brake remains applied with reservoir pressure below the predetermined threshold pressure.

FIG. 6 shows a scenario of the parking brake system 10 with the parking brake 12 applied. Brake pipe pressure is above the upper brake pipe pressure threshold. However, the reservoir pressure is below the reservoir pressure threshold. Since the reservoir pressure is below the reservoir pressure threshold with the parking brake applied, the reservoir release valve 28 prevents the brake pipe pressure from reaching the parking brake cylinder 22 to cause the release of the parking brake 12.

Figure 7:
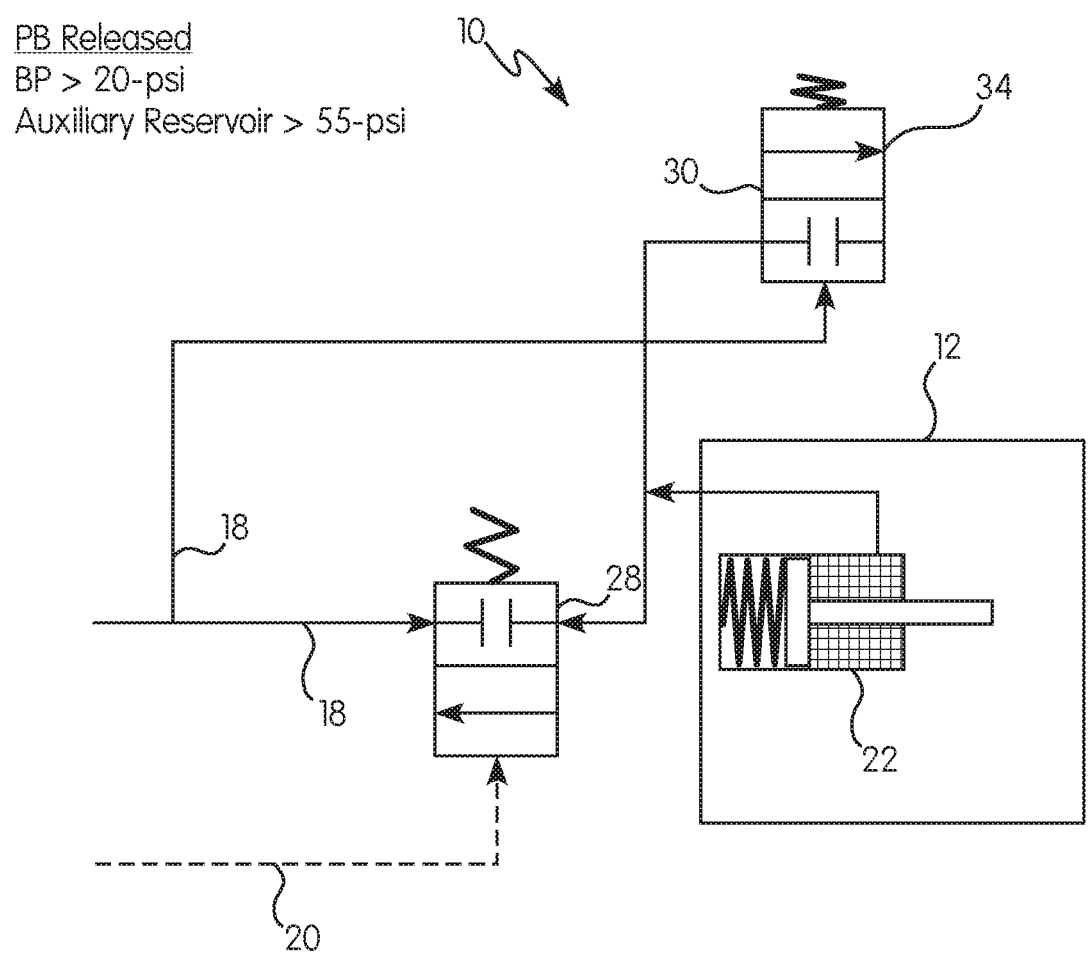
FIG. 7 is a schematic view of one embodiment of a parking brake system showing the parking brake released.
Figure 8:
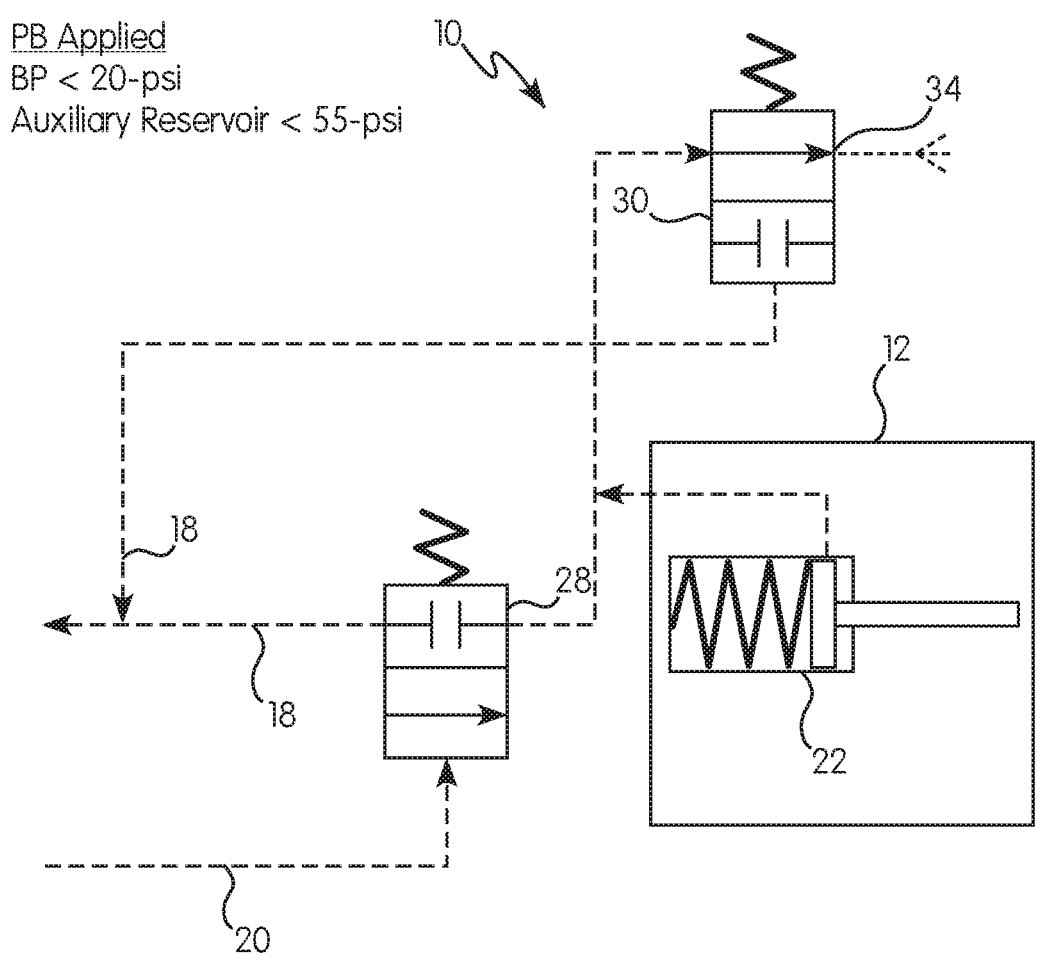
FIG. 8 is a schematic view of one embodiment of a parking brake system showing the parking brake applied.

In certain situations, the reservoir pressure may decrease below the reservoir pressure threshold and isolate the parking brake pressure from the brake pipe pressure. FIGS. 7-8 are examples of these situations.

In FIG. 7, the parking brake 12 is released because there is initially sufficient brake pipe pressure and reservoir pressure. The parking brake pressure in the parking brake cylinder 22 is equal to the brake pipe pressure. The reservoir pressure then decreases below the reservoir pressure threshold; however, the brake pipe pressure remains above the lower brake pipe pressure threshold. With the decrease in reservoir pressure below the reservoir pressure threshold, the reservoir release valve 28 is moved to position one, preventing the brake pipe pressure from reaching the actuation cylinder vent valve. Therefore, the parking brake is isolated from brake pipe pressure. In this scenario, the brake pipe pressure is still sufficient to keep the actuation cylinder vent valve 30 in position two so that the parking brake pressure does not vent to atmosphere. Thus, even though the reservoir pressure decreases below the reservoir pressure threshold, the parking brake 12 remains released because there is sufficient parking brake pressure still in the parking brake cylinder 22.

FIG. 8 shows a scenario of the parking brake system 10 with the parking brake 12 initially applied. In this scenario, like the scenario in FIG. 7, the reservoir pressure decreases below the reservoir pressure threshold. However, unlike FIG. 7, the brake pipe pressure also decreases, and it decreases below the lower brake pipe pressure threshold. Since the brake pipe pressure is below the lower brake pipe pressure threshold, the actuation cylinder vent valve 30 is moved to position one so that the parking brake pressure is vented to atmosphere through the timing volume 32 and the exhaust 34, causing application of the parking brake 12.

Figure 9A:
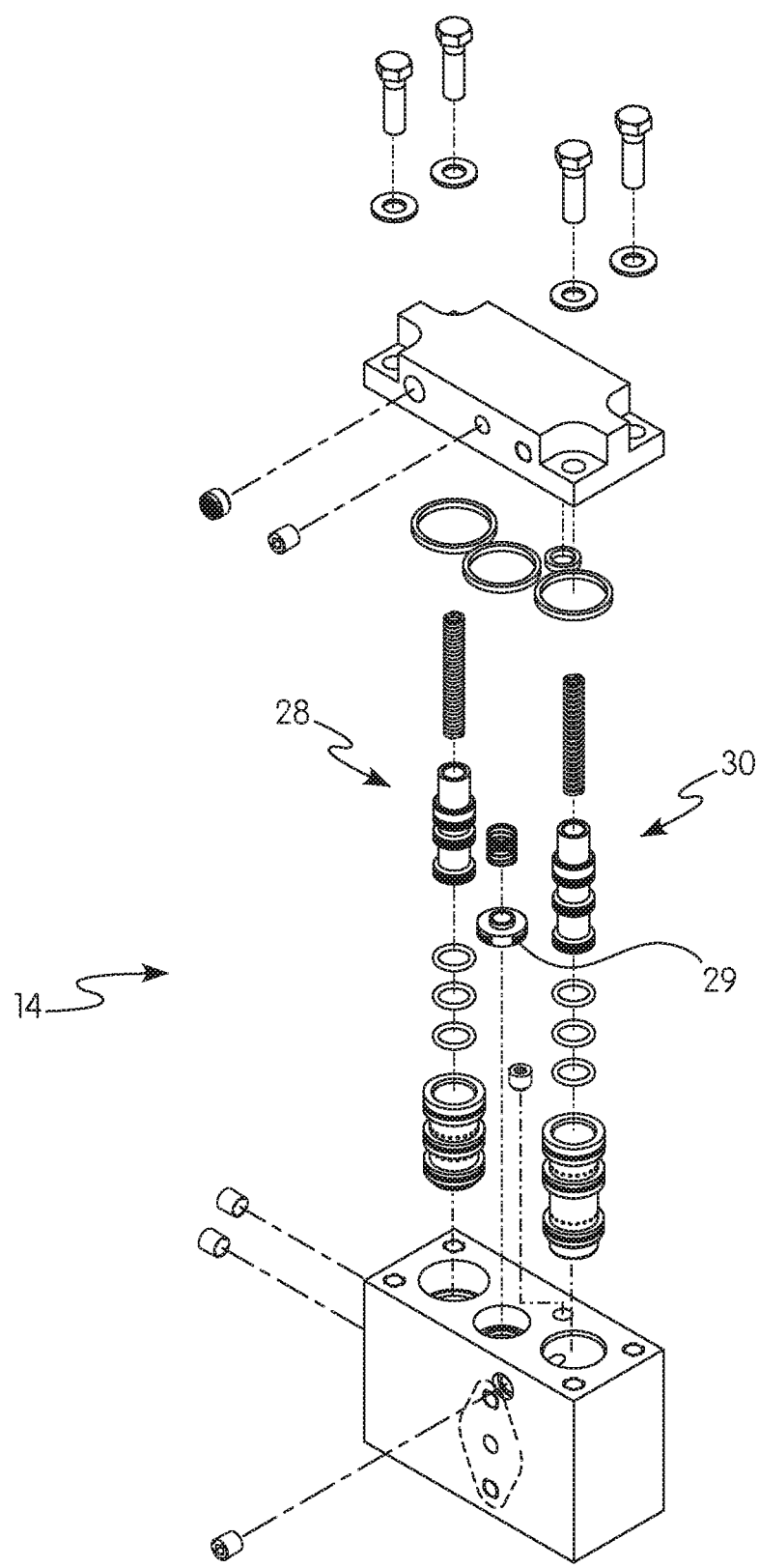
FIGS. 9A-9D are several views of one embodiment of a parking brake control module according to the present invention.
Figure 9B:
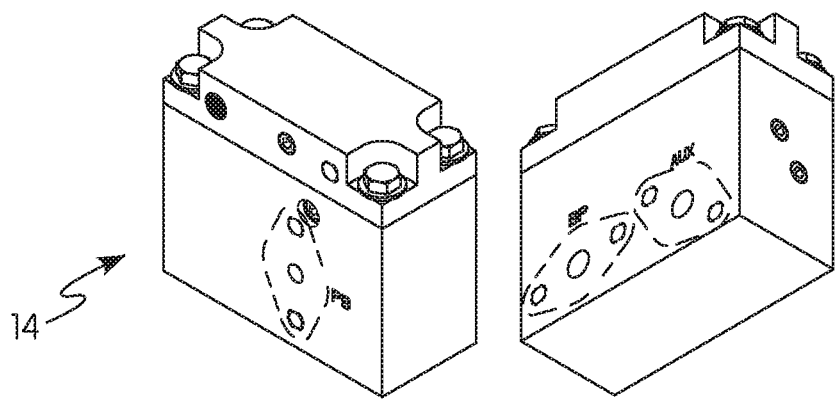
Figure 9C:
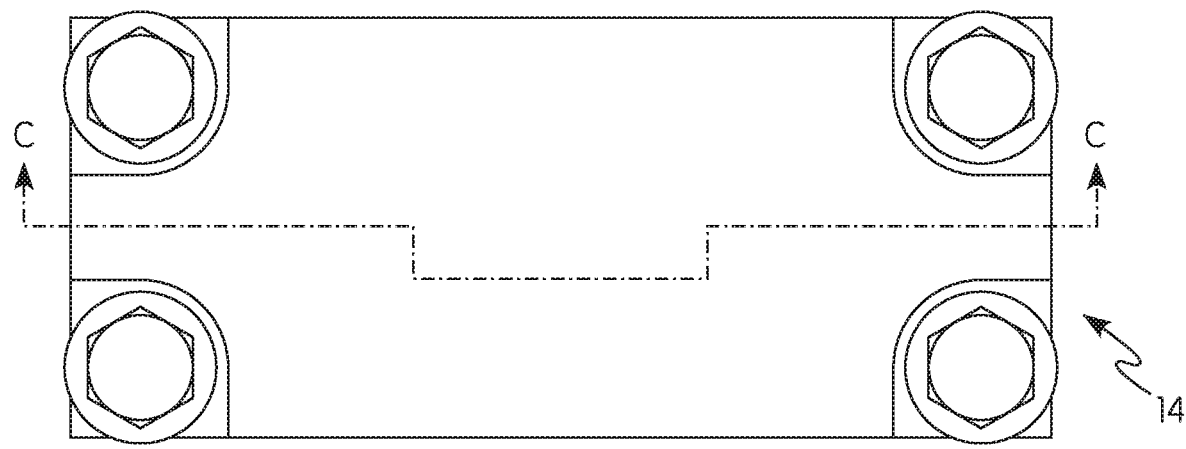
Figure 9D:
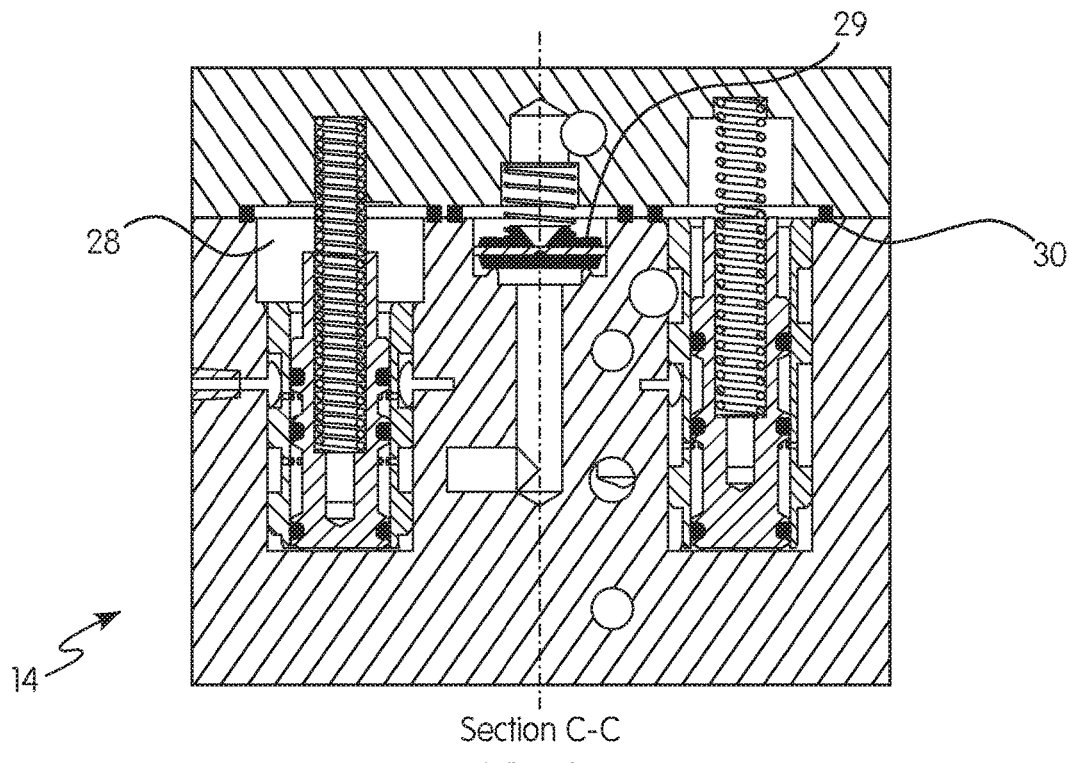

FIGS. 9A-9D show several views of one embodiment of the parking brake control module 14, including an exploded view (FIG. 9A), several perspective views (FIG. 9B), a top view (FIG. 9C), and a cross sectional view along line C-C of FIG. 9C (FIG. 9D). These views show an embodiment in which one check valve 29 and two spool valves 28, 30 are used in the parking brake control module 14. The reservoir release valve 28 and the actuation cylinder vent valve 30 are spool valves. The check valve 29 shown, for instance, in FIG. 9D, allows for the charging of the parking brake cylinder 22, and maintains the brake pipe charge pressure until the actuation cylinder vent valve 30 reaches a threshold to vent the parking brake pressure. Brake pipe pressure to the parking brake cylinder 22 charges through this check valve 29. When a brake pipe reduction is made, the pressure in the parking brake cylinder 22 remains at the fully charged pressure. FIG. 9B shows the inlets through which reservoir pressure and brake pipe pressure enter the parking brake control module 14. FIG. 9B also shows the outlet thorough which brake pipe pressure flows out of the parking brake control module 14.

Figure 10A:
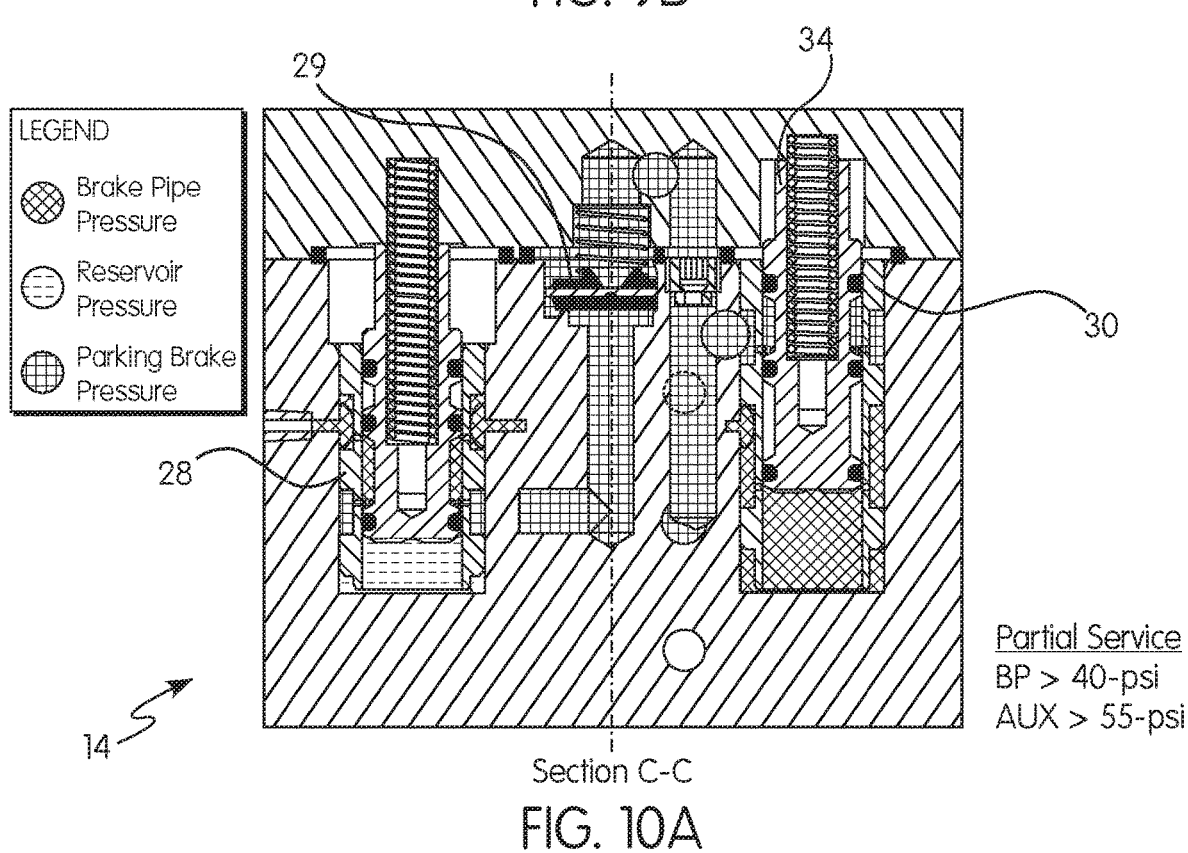
FIGS. 10A-10C are several cross-sectional views along line C-C of FIG. 9C showing one embodiment of a parking brake control module in several different service positions according to the present invention.
Figure 10B:
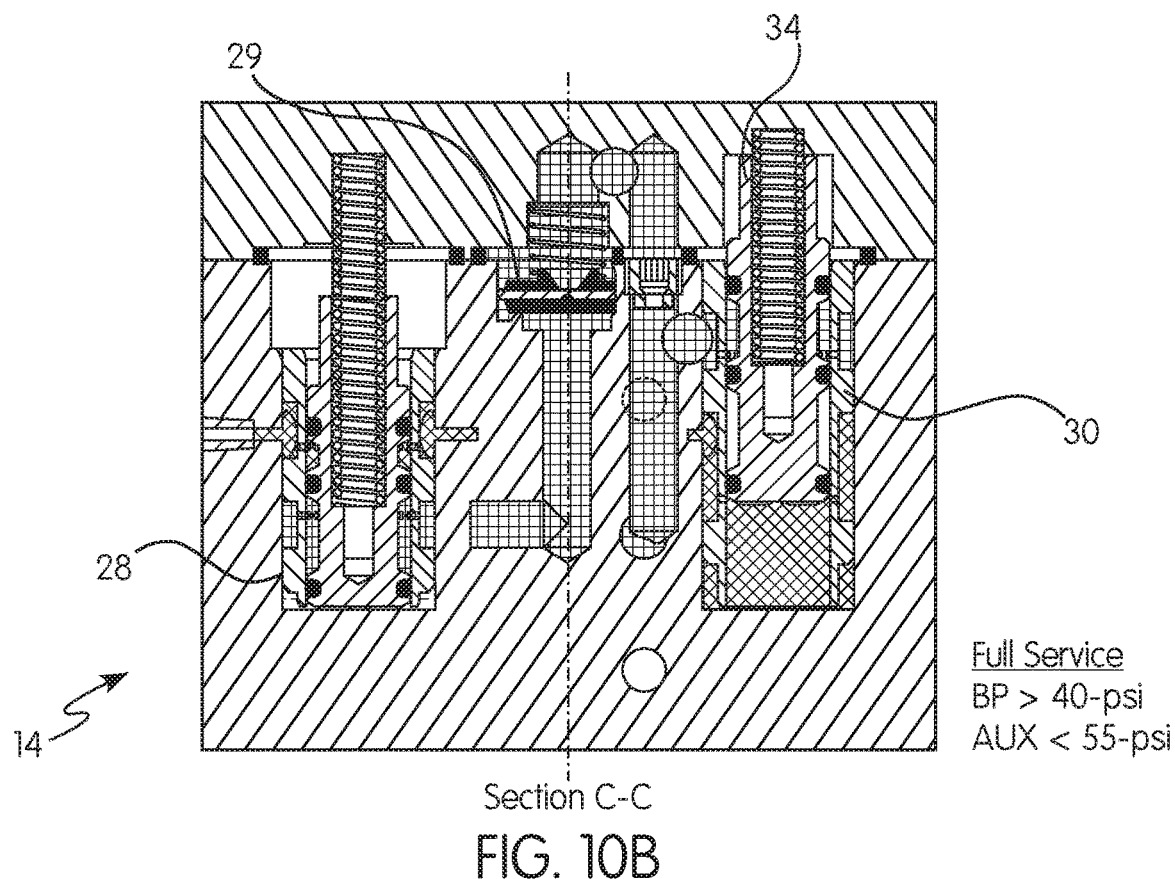
Figure 10C:
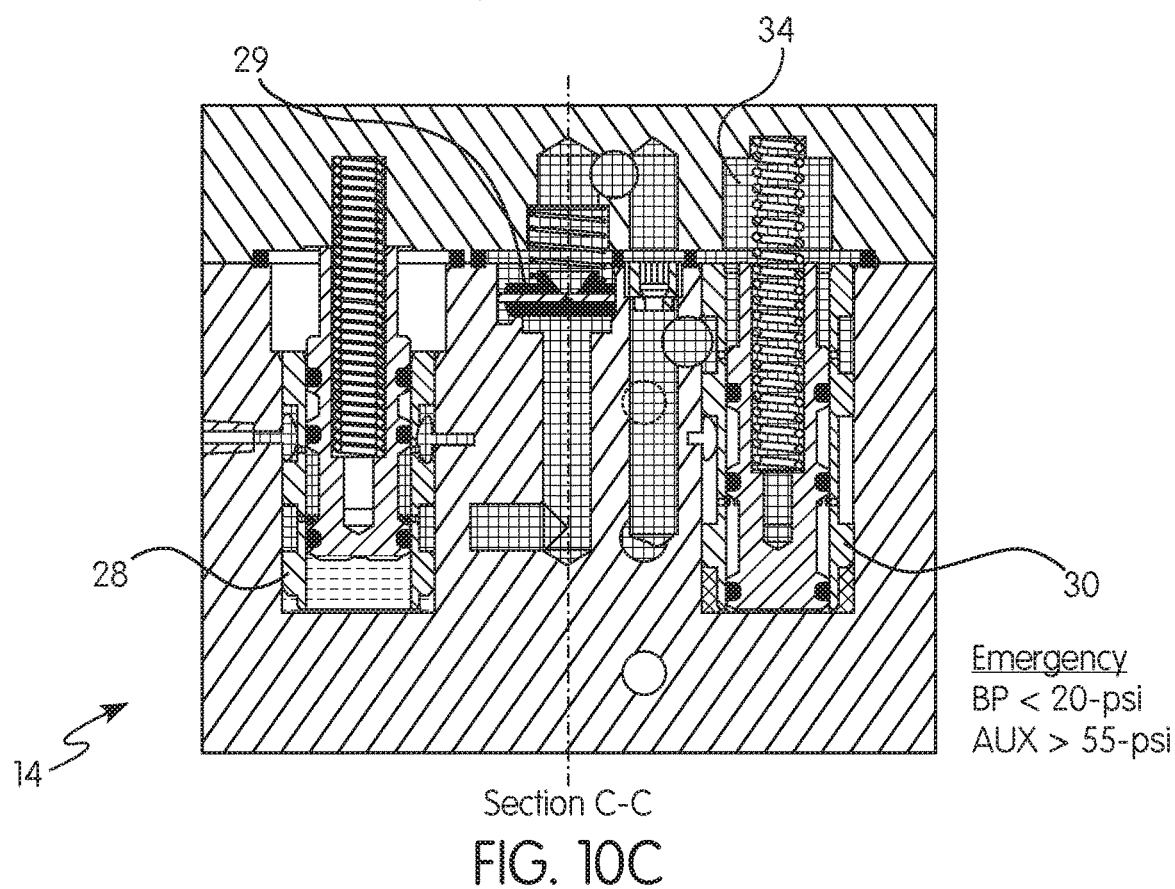

FIGS. 10A-10C show schematic views of the parking brake control module 14 in several different service positions. The legend associated with FIG. 10A shows the flow through the parking brake control module, whether the flow be reservoir pressure, brake pipe pressure, or parking brake pressure. This legend of the flow applies throughout the drawings, where applicable. FIG. 10A shows the parking brake control module 14 in a partial service position. The brake pipe pressure exceeds the upper brake pipe pressure threshold (e.g., 40 psi), and the reservoir pressure exceeds the reservoir pressure threshold (e.g., 55 psi). In the partial service configuration, the exhaust 34 is closed. The brake pipe pressure decreases upstream of the check valve 29. The brake pipe pressure is connected to the reservoir release valve 28 through the actuation cylinder vent valve 30. The brake pipe pressure remains unchanged downstream of the check valve 29. In the partial service position, the parking brake 12 (not shown) is released. FIG. 10B shows the parking brake control module 14 in a full service position. The brake pipe pressure exceeds the upper brake pipe pressure threshold (e.g., 40 psi), and the reservoir pressure is below the reservoir pressure threshold (e.g., 55 psi). In the full service configuration, the exhaust 34 is closed. Brake pipe pressure decreases upstream of the reservoir release valve 28 through the actuation cylinder vent valve 30. Brake pipe pressure between the check valve 29 and the reservoir release valve 28 is isolated. Brake pipe pressure downstream of the check valve 29 is unchanged. In this position, the parking brake 12 is released. FIG. 10C shows the parking brake control module 14 in an emergency position. The brake pipe pressure falls below the lower brake pipe pressure threshold (e.g., 20 psi), and the exhaust 34 is open. No brake pipe pressure flows to the reservoir release valve 28 through the actuation cylinder vent valve 30. Brake pipe pressure is directed to the exhaust 34 downstream of the reservoir release valve 28. The parking brake 12 is applied.

Figure 11A:
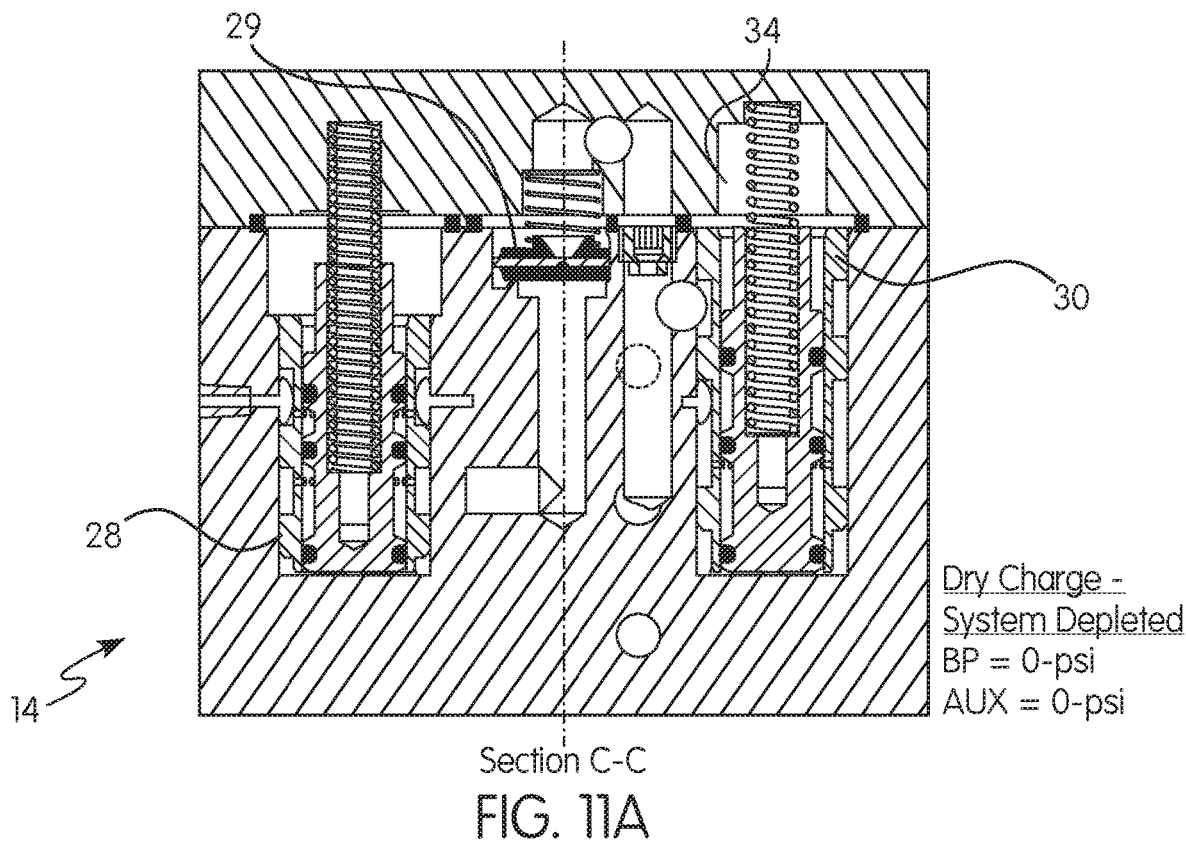
FIGS. 11A-11D are several cross-sectional views along line C-C of FIG. 9C showing one embodiment of a parking brake control module in different states according to the present invention.
Figure 11B:
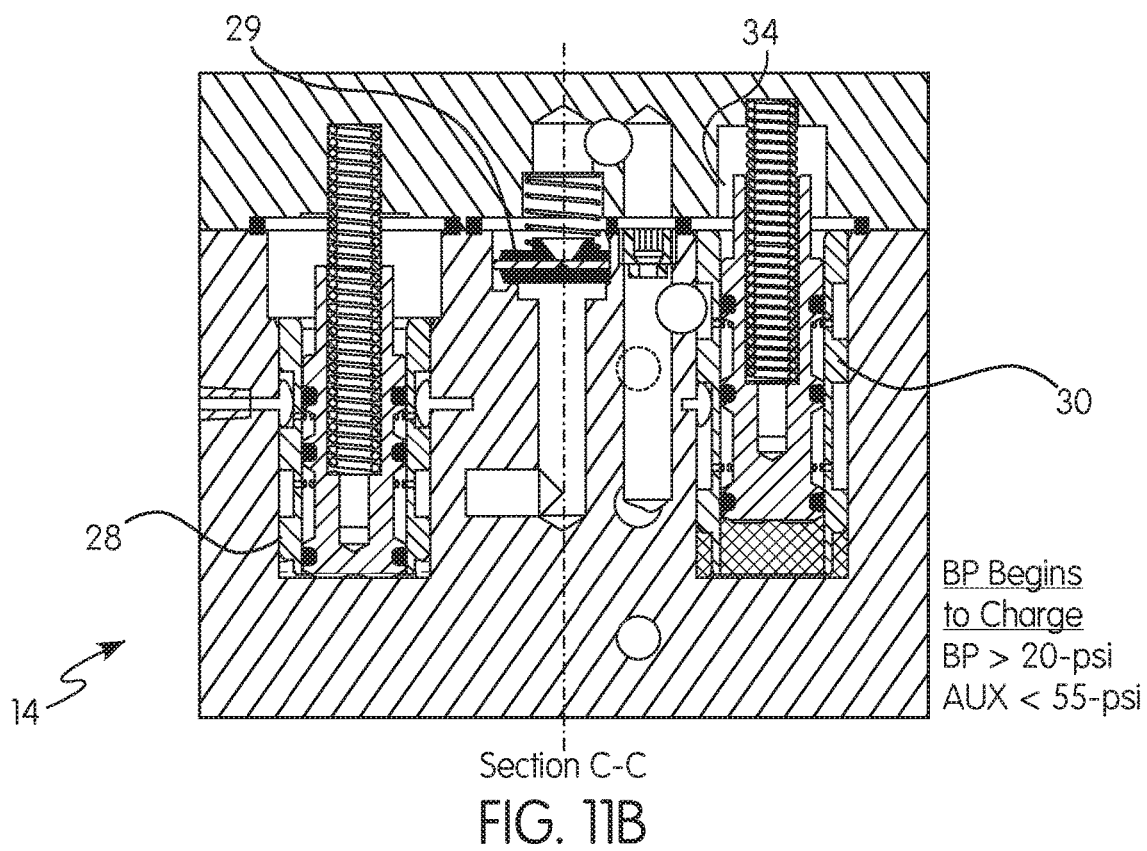
Figure 11C:
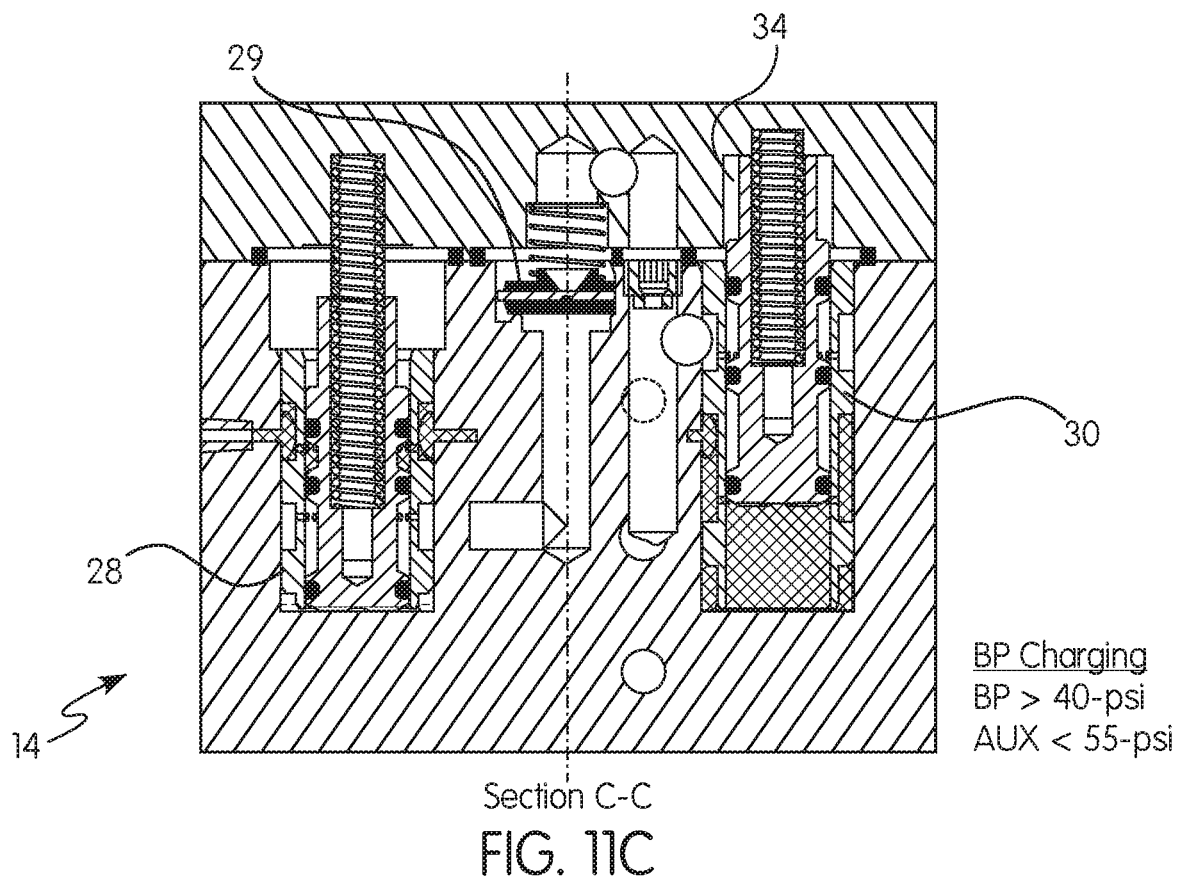
Figure 11D:
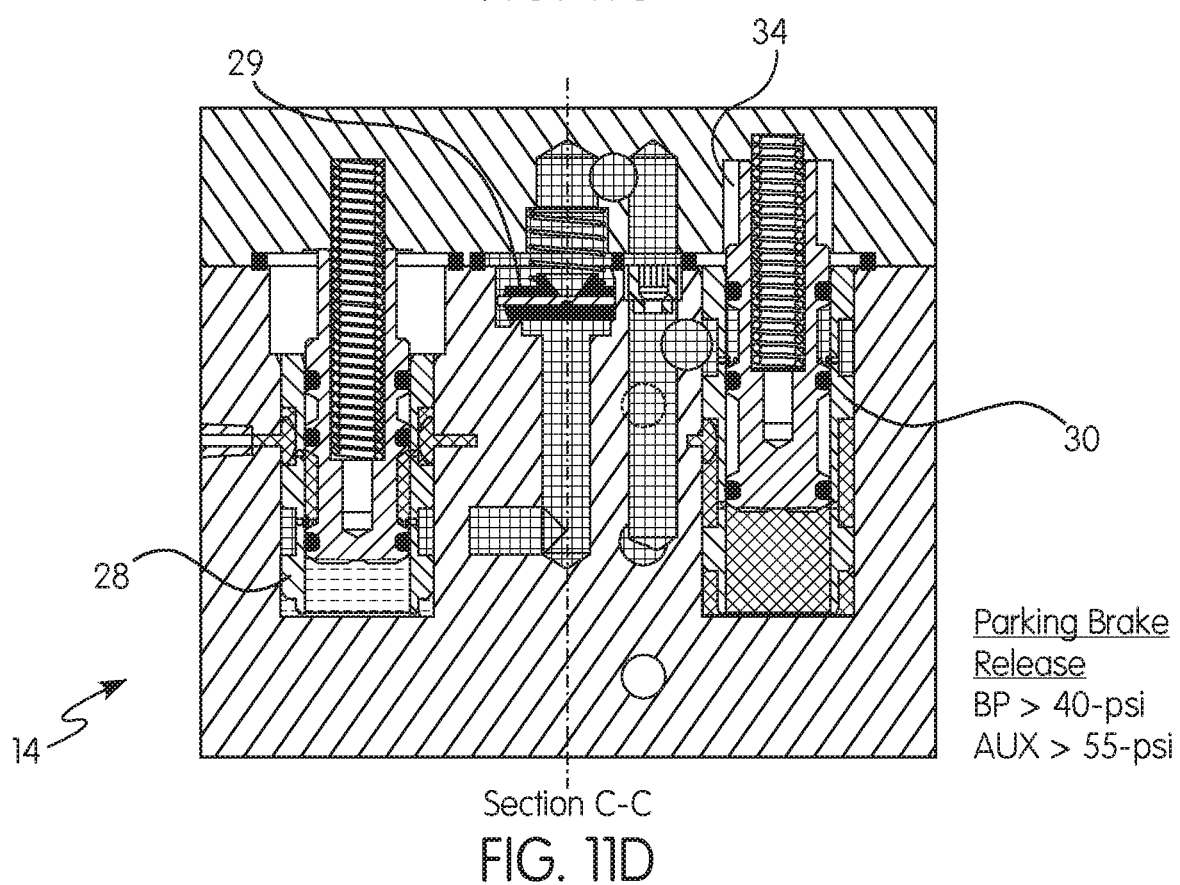

FIGS. 11A-11D show several schematic views of the parking brake control module 14 starting in the depleted state (where the parking brake 12 (not shown) is applied) and progressing to the state in which the parking brake 12 is released. In FIG. 11A, the parking brake control module 14 is in its depleted state with the brake pipe pressure and reservoir pressure at 0 psi. The parking brake 12 is applied in the depleted state. In FIG. 11B, the brake pipe pressure begins to charge. For instance, the brake pipe pressure exceeds the lower brake pipe pressure threshold (e.g., 20 psi) and the reservoir pressure is below the reservoir pressure threshold (e.g., 55 psi). The exhaust 34 is closed as the brake pipe pressure begins to charge. No brake pipe pressure flows to the reservoir release valve 28 yet, and the parking brake 12 is still applied. FIG. 11C shows the brake pipe further charging. In this state, the brake pipe pressure exceeds the upper brake pipe pressure threshold (e.g., 40 psi), and the reservoir pressure is below the reservoir pressure threshold (e.g., 55 psi). The exhaust 34 is closed. The brake pipe pressure flows to the reservoir release valve 28 through the actuation cylinder vent valve 30. No brake pipe pressure flows to the parking brake 12, however. The parking brake 12 is still applied. Finally, FIG. 11D shows the parking brake 12 released. The brake pipe pressure exceeds the upper brake pipe pressure threshold (e.g., 40 psi), and the reservoir pressure exceeds the reservoir pressure threshold (e.g., 55 psi). The exhaust 34 is closed. The brake pipe pressure flows to the reservoir release valve 28 through the actuation cylinder vent valve 30. Brake pipe pressure flows to the parking brake 12, and the parking brake 12 is released.

Figure 12:
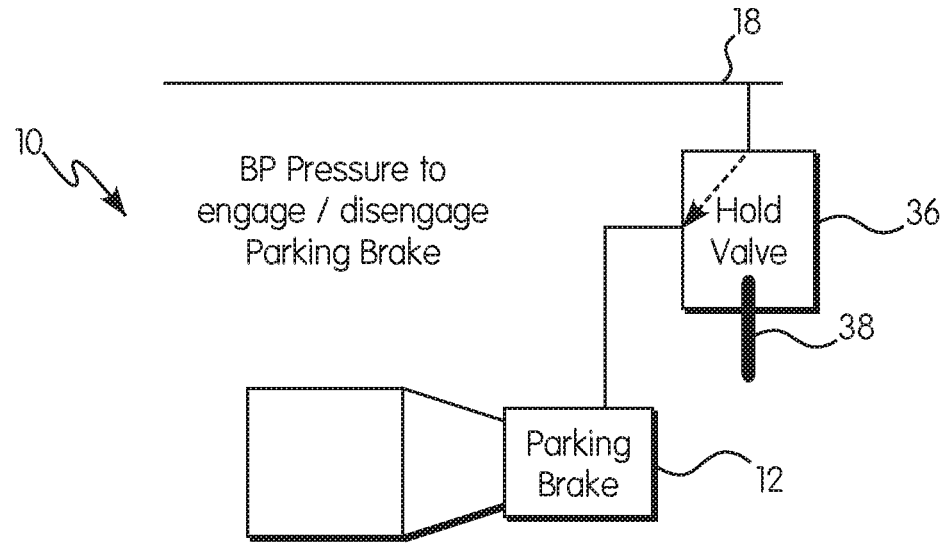
FIG. 12 is a schematic view of one embodiment of a parking brake system using a hold valve with the hold switch released according to the present invention.
Figure 13:
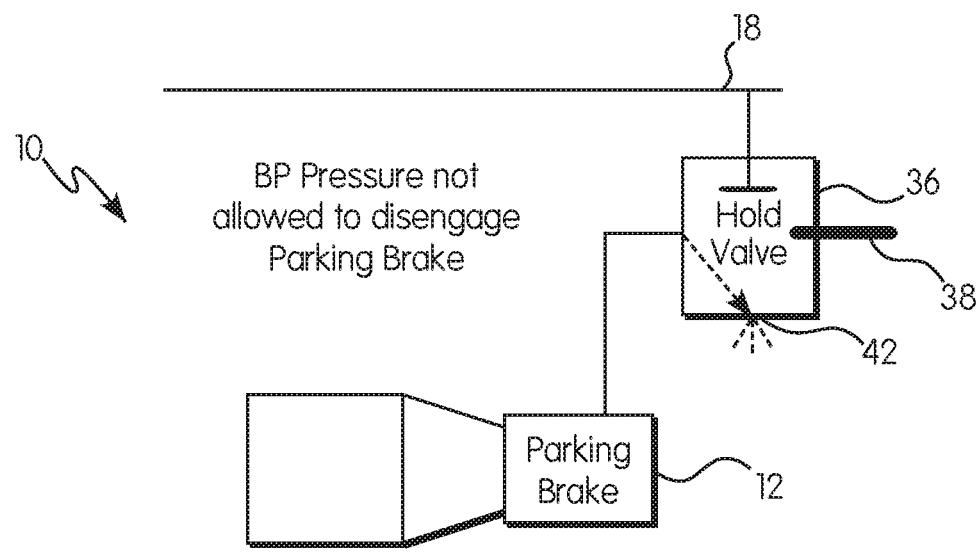
FIG. 13 is a schematic view of one embodiment of a parking brake system using a hold valve with the hold switch in the hold position according to the present invention.

Referring to FIGS. 12-13, in another embodiment, the parking brake system 10 includes a hold valve 36. As previously described the parking brake 12 is a device that will secure the parking brake cylinder 22 in an applied position, maintaining the force output of the brake application by locking the brake rigging in the applied state. The actuation of the parking brake 12 occurs with a loss in brake pipe pressure.

The hold valve 36 includes a hold switch 38, which is a manual switch (operated by a user) that prevents the release of the parking brake 12 until the train is ready for the parking brake 12 to be released. The hold switch 38 allows for manual operation of the hold valve 36 to control the connection of the brake pipe pressure to the parking brake 12. The hold switch 38 manually operates the hold valve 36 between two positions: a release position and a hold position.

FIG. 12 shows the control logic of the parking brake system 10 with the hold switch 38 such that the hold valve 36 is in the release position. With the hold valve 36 in the release position, the hold valve 36 allows the brake pipe pressure to flow through the hold valve 36 and to the parking brake 12. Since brake pipe pressure is directed to the parking brake 12, the hold valve 36 does not prevent the parking brake 12 from being released. The parking brake 12 can only be pressurized (and the parking brake 12 released) if the hold valve 36 is in this release position.

FIG. 13 shows the control logic of the parking brake system 10 with the hold switch 38 such that the hold valve 36 is in the hold position. With the hold valve 36 in the hold position, the hold valve 36 prevents the brake pipe pressure from reaching the parking brake 12 (brake pipe pressure is isolated from the parking brake 12). Instead, the brake pipe pressure is vented to a hold valve exhaust 42. The hold position prevents the parking brake 12 from being released.

The addition of the hold valve 36 to the parking brake system 10 allows a certain number of cars to retain or hold the force output while the brake system is recharged. A train crew manually controls the hold switch 38 to adjust the position of the hold valve 36. This ensures that the train crew is in complete control of train securement because the hold valve 36 in the hold position allows the brake system to recharge while the cars having the hold valve 36 in the hold position will retain the parking brake 12 in the applied position. In one embodiment, the hold switch 38 is a handle attached to a ball valve. In this embodiment, moving the hold valve 36 between the release position and the hold position (manually adjusting the hold switch 38) merely requires turning the ball valve handle.

Figure 14:
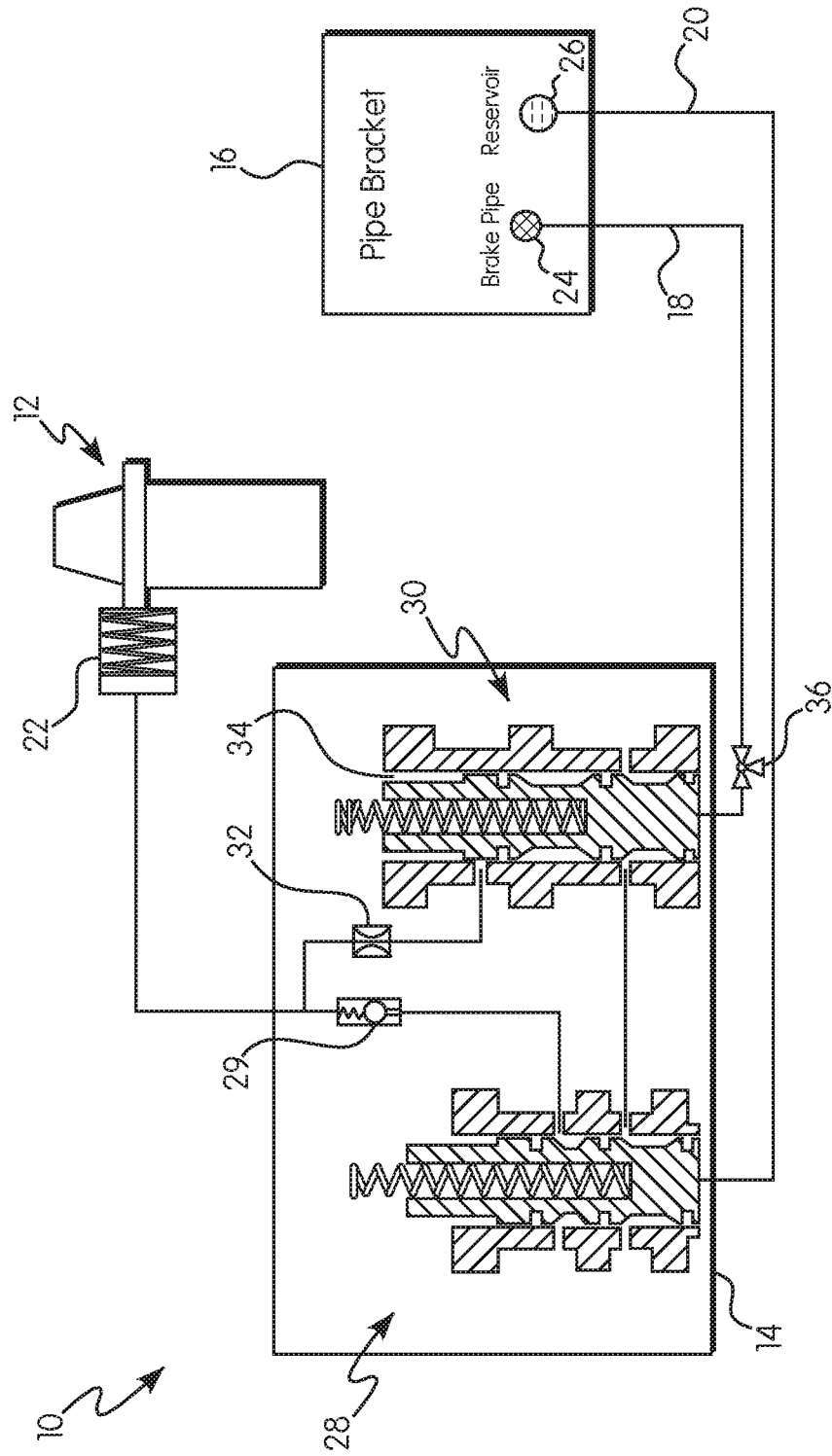
FIG. 14 is a schematic view of one embodiment of a parking brake system including a hold valve with the entire system in a vented state with the parking brake applied.

Referring to FIGS. 14-18 a parking brake system 10 including a hold valve 36 is shown in different states, according to one embodiment of the invention. FIG. 14 shows the entire parking brake system 10 vented such that the parking brake 12 is applied. The hold valve 36 is in the release position.

Figure 15:
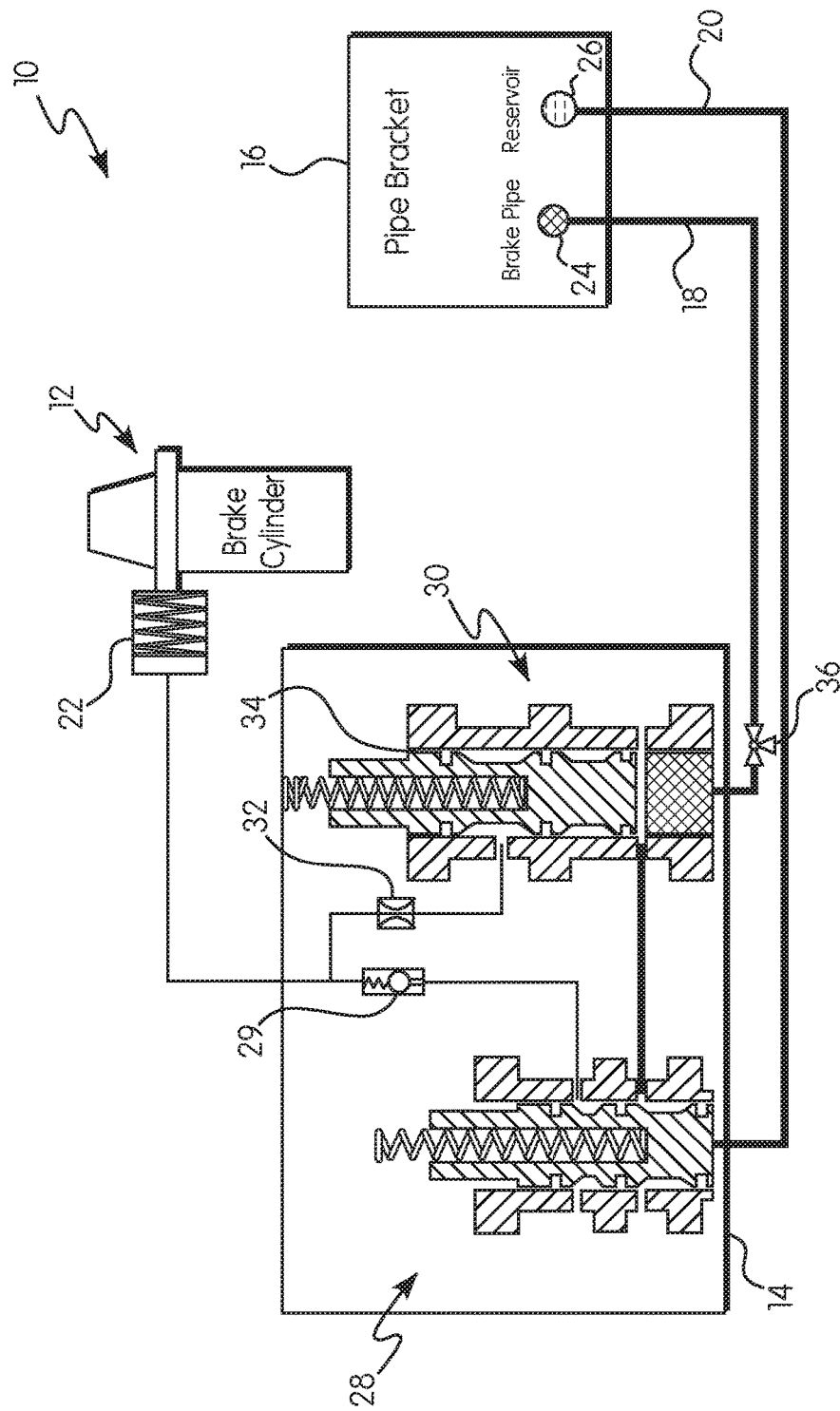
FIG. 15 is a schematic view of one embodiment of a parking brake system including a hold valve with the system partially charged and with the parking brake applied.

FIG. 15 shows the parking brake system 10 partially charged and with the hold valve 36 in the release position. The parking brake 12 is applied. In the parking brake system 10 shown in FIG. 15, the brake pipe pressure is above the upper brake pipe pressure threshold, and the actuation cylinder vent valve 30 is in its second position such that brake pipe pressure is directed to the reservoir release valve 28. However, the reservoir release valve 28 is in its first position to prevent the brake pipe pressure from flowing through the reservoir release valve 28 and to the parking brake 12. This is because the reservoir pressure is below the reservoir pressure threshold.

Figure 16:
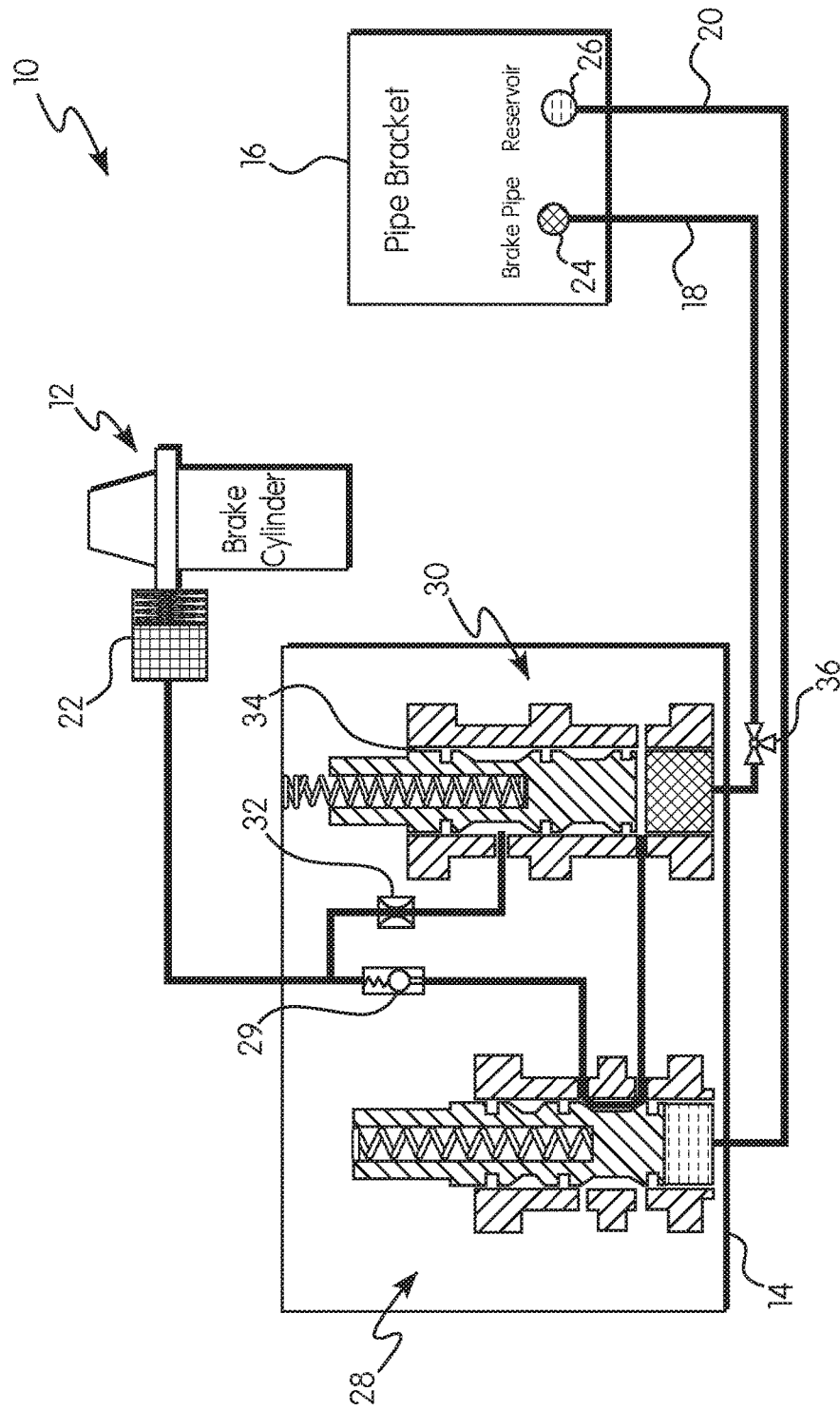
FIG. 16 is a schematic view of one embodiment of a parking brake system including a hold valve with the system fully charged and with the parking brake released.

FIG. 16 shows the parking brake system 10 fully charged, and with the parking brake 12 released. The hold valve 36 is in the release position. The brake pipe pressure is above the brake pipe pressure threshold so that the actuation cylinder vent valve 30 is in its second position. Brake pipe pressure is, thus, directed to the reservoir release valve 28. The reservoir pressure is above the reservoir pressure threshold so that the reservoir release valve 28 is in its second position, allowing brake pipe pressure to flow to the parking brake cylinder 22 to apply the parking brake 12. Since the actuation cylinder vent valve 30 is in its second position, brake pipe pressure is prevented from leaving the parking brake system 10 and flowing through the exhaust 34.

Figure 17:
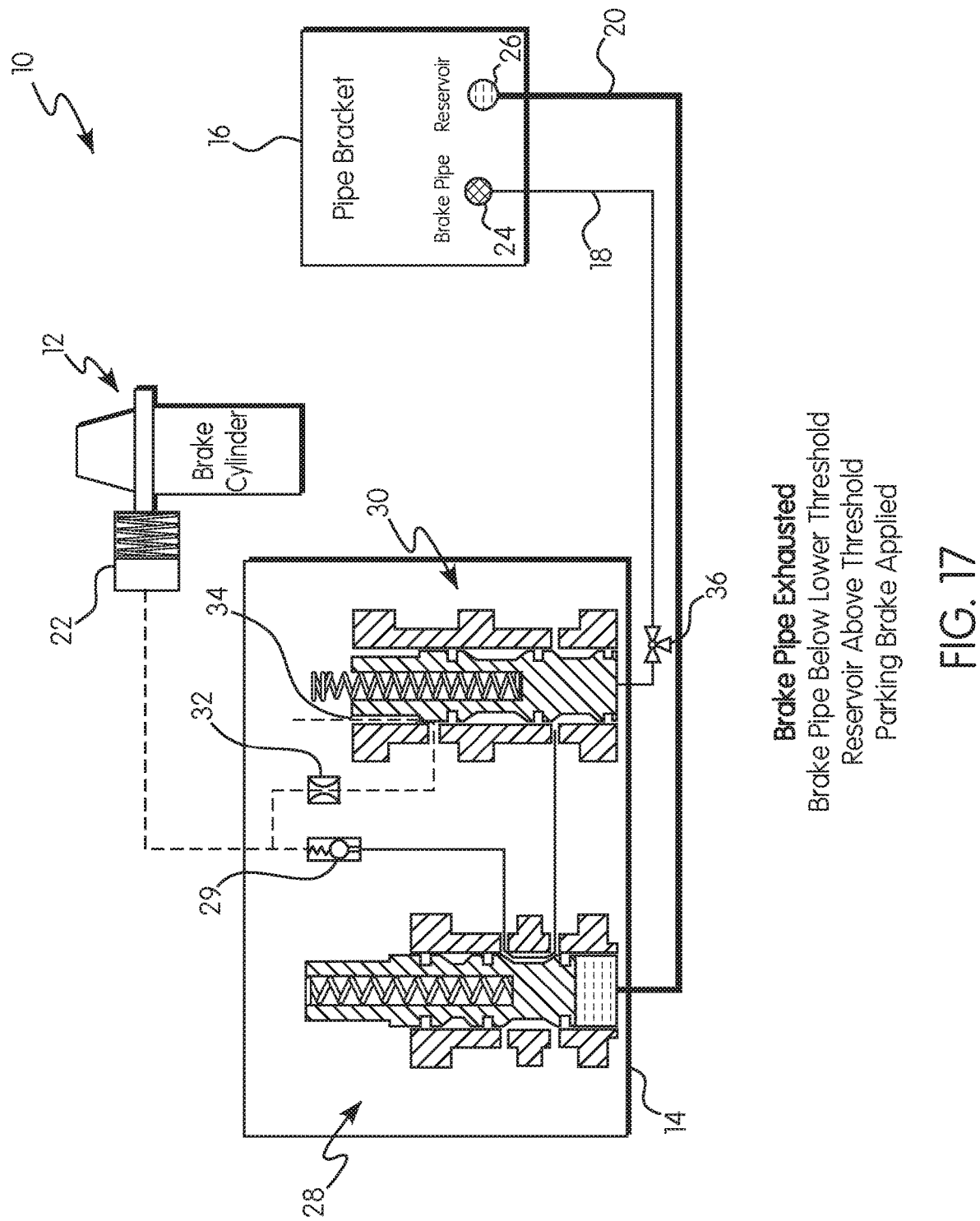
FIG. 17 is a schematic view of one embodiment of a parking brake system including a hold valve with brake pipe exhausted and the parking brake applied.

FIG. 17 shows the parking brake system 10 exhausted. The hold valve 36 is in the release position. The reservoir release valve 28 is in its second position since the reservoir pressure is above the reservoir pressure threshold. However, the brake pipe pressure is below the lower brake pipe pressure threshold, such that the actuation cylinder vent valve 30 is in its first position. Therefore, any pressure built up in the parking brake 12 can flow through the timing volume 32 and to exhaust 34 to apply the parking brake 12.

Figure 18:
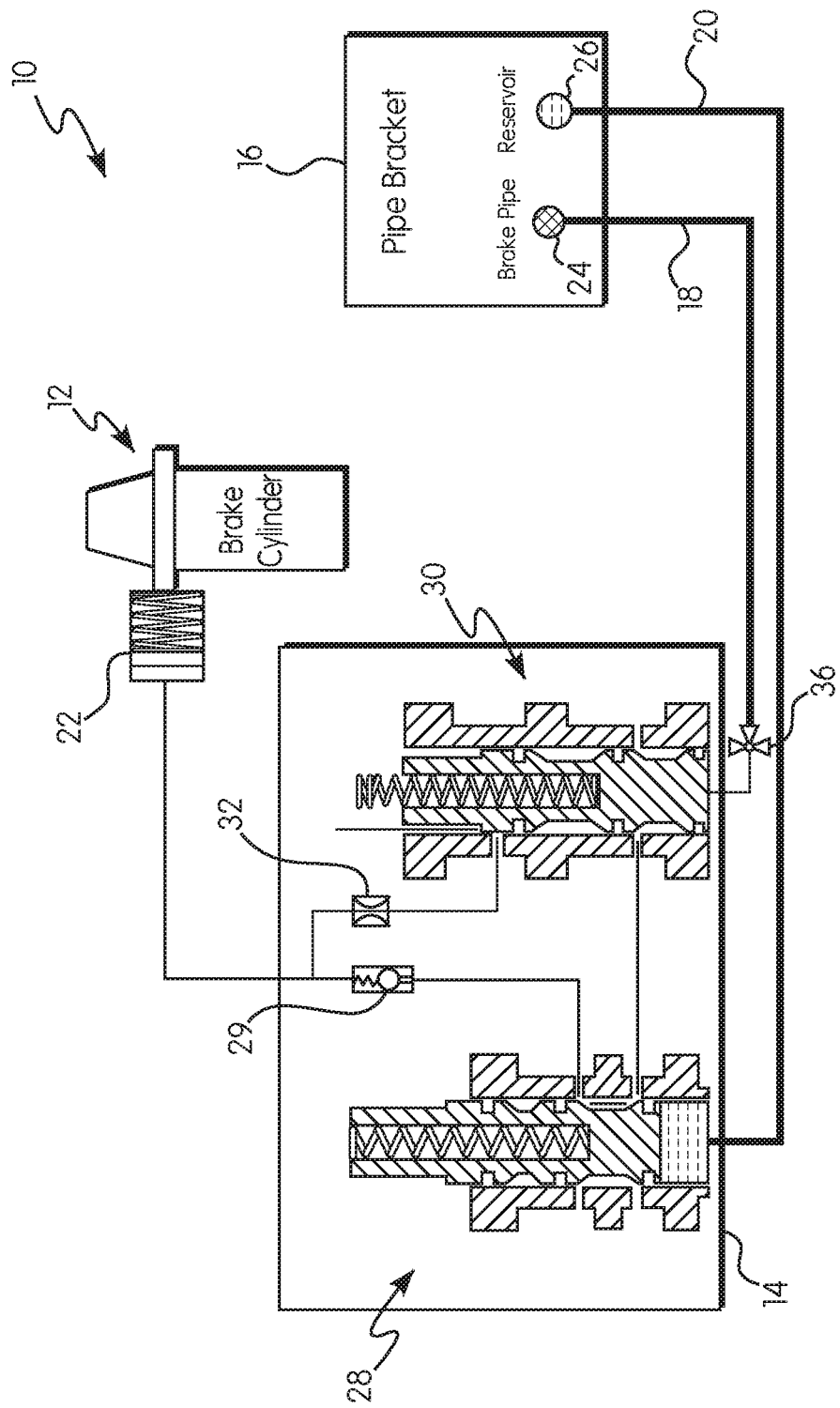
FIG. 18 is a schematic view of one embodiment of a parking brake system including a hold valve with the hold valve switched to the hold position and the parking brake applied.

FIG. 18 shows the parking brake system 10 with the parking brake 12 applied. The reservoir release valve 28 is in its second position since the reservoir pressure is above the reservoir pressure threshold. However, the hold valve 36 is in the hold position. Even though brake pipe pressure is above the upper brake pipe pressure threshold, the hold valve 36 prevents the brake pipe pressure from flowing to the actuation cylinder vent valve 30 and moving the actuation cylinder vent valve 30 from its first position to its second position. Thus, the brake pipe pressure does not reach the parking brake 12, and the parking brake 12 is not released.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiments can be combined with one or more features of any other embodiments.

The invention claimed is:

1. A parking brake control module comprising:
   a brake pipe passageway for flow of a brake pipe pressure;
   a reservoir passageway for flow of a reservoir pressure;
   a reservoir release valve in fluid communication with the brake pipe passageway;
   an actuation cylinder vent valve in fluid communication with the reservoir release valve;
   an exhaust in fluid communication with a parking brake cylinder of a parking brake to allow a parking brake pressure to escape to the atmosphere to apply the parking brake; and
   a timing volume located between the parking brake and the exhaust to delay the pressure decrease at the parking brake when the parking brake pressure is released through the exhaust,
   wherein the parking brake is applied when the brake pipe pressure falls to or below a lower brake pipe pressure threshold, and wherein the parking brake is released when the brake pipe pressure is above an upper brake pipe pressure threshold and the reservoir pressure is above a reservoir pressure threshold.

2. The parking brake control module of claim 1, wherein the reservoir release valve comprises a first position and a second position, the first position prevents the brake pipe pressure from flowing to the actuation cylinder vent valve, and the second position allows brake pipe pressure to flow through the reservoir release valve to the actuation cylinder vent valve.

3. The parking brake control module of claim 1, wherein the actuation cylinder vent valve comprises a first position and a second position, the first position directs the parking brake pressure from the parking brake cylinder to the exhaust and the second position prevents the parking brake pressure from the parking brake cylinder from being directed to the exhaust.

4. The parking brake control module of claim 1, wherein the lower brake pipe pressure threshold is 20 psi, the upper brake pipe pressure threshold is 40 psi, and the reservoir pressure threshold is 55 psi.

5. The parking brake control module of claim 1, wherein the lower brake pipe pressure threshold is 20 psi, the upper brake pipe pressure threshold is 40 psi, and the reservoir pressure threshold is 60 psi.

6. The parking brake control module of claim 2, wherein the reservoir release valve is in the first position when the reservoir pressure is at or below the reservoir pressure threshold.

7. The parking brake control module of claim 3, wherein the actuation cylinder vent valve is in the first position when the brake pipe pressure is at or below the lower brake pipe pressure threshold.

8. The parking brake control module of claim 1, wherein the reservoir passageway flows auxiliary reservoir pressure,
   wherein the parking brake is applied when brake pipe pressure falls to or below the lower brake pipe pressure threshold, and wherein the parking brake is released when the brake pipe pressure is above the upper brake pipe pressure threshold and the auxiliary reservoir pressure is above the reservoir pressure threshold.

9. The parking brake control module of claim 1, wherein the reservoir passageway flows supply reservoir pressure,
   wherein the parking brake is applied when brake pipe pressure falls to or below the lower brake pipe pressure threshold, and wherein the parking brake is released when the brake pipe pressure is above the upper brake pipe pressure threshold and the supply reservoir pressure is above the reservoir pressure threshold.

10. The parking brake control module of claim 1, wherein the reservoir passageway flows emergency reservoir pressure,
    wherein the parking brake is applied when brake pipe pressure falls to or below the lower brake pipe pressure threshold, and wherein the parking brake is released when the brake pipe pressure is above the upper brake pipe pressure threshold and the emergency reservoir pressure is above the reservoir pressure threshold.

11. A method to control a parking brake comprising:
    flowing a brake pipe pressure into a parking brake control module via a brake pipe passageway;
    flowing a reservoir pressure into a parking brake control module via a reservoir passageway;
    applying the parking brake when the brake pipe pressure falls to or below a lower brake pipe pressure threshold;
    allowing a parking brake pressure to escape to the atmosphere to apply the parking brake;
    delaying the parking brake pressure decrease via a timing volume located between the parking brake and an exhaust, that is in fluid communication with a parking brake cylinder of the parking brake when the parking brake pressure is released through the exhaust; and
    releasing the parking brake when the brake pipe pressure is above an upper brake pipe pressure threshold and a reservoir pressure is above a reservoir pressure threshold.

12. The method of claim 11, wherein the parking brake control module comprises a reservoir release valve and an actuation cylinder vent valve.

13. The method of claim 12, wherein the reservoir release valve comprises a first position and a second position, the first position prevents the brake pipe pressure from flowing to the actuation cylinder vent valve, and the second position allows the brake pipe pressure to flow through the reservoir release valve to the actuation cylinder vent valve.

14. The method of claim 13, wherein the reservoir release valve is in the first position when the reservoir pressure is at or below the reservoir pressure threshold.

15. The method of claim 12, wherein the actuation cylinder vent valve comprises a first position and a second position, the first position directs the parking brake pressure from the parking brake cylinder of the parking brake to the exhaust and the second position prevents the parking brake pressure from the parking brake cylinder from being directed to the exhaust.

16. The method of claim 15, wherein the actuation cylinder vent valve is in the first position when the brake pipe pressure is at or below the lower brake pipe pressure threshold.

17. The method of claim 11, wherein the reservoir pressure flowed into the parking brake control module via the reservoir passageway is an auxiliary reservoir pressure,
wherein the parking brake is released when the brake pipe pressure is above the upper brake pipe pressure threshold and the auxiliary reservoir pressure is above the reservoir pressure threshold.

18. The method of claim 11, wherein the reservoir pressure flowed into the parking brake control module via the reservoir passageway is supply reservoir pressure,
wherein the parking brake is released when the brake pipe pressure is above the upper brake pipe pressure threshold and the supply reservoir pressure is above the reservoir pressure threshold.

19. The method of claim 11, wherein the reservoir pressure flowed into the parking brake control module via the reservoir passageway is an emergency reservoir pressure,
wherein the parking brake is released when the brake pipe pressure is above the upper brake pipe pressure threshold and an auxiliary reservoir pressure is above an emergency pressure threshold.

20. A system for controlling a parking brake comprising:
a brake pipe passageway through which brake pipe pressure flows;
a parking brake;
an exhaust in fluid communication with a parking brake cylinder of the parking brake to allow a parking brake pressure to escape to the atmosphere to apply the parking brake;
a timing volume located between the parking brake and the exhaust to delay the pressure decrease at the parking brake when the parking brake pressure is released through the exhaust; and
a hold valve comprising a first position and a second position,
wherein in the first position, the hold valve directs brake pipe pressure to the parking brake, and in the second position, the hold valve prevents brake pipe pressure from flowing to the parking brake.

21. The system of claim 20, wherein the exhaust is a hold valve exhaust, and wherein in the second position, the brake pipe pressure is vented through the hold valve exhaust.

22. The system of claim 20, wherein the hold valve comprises a manually operable hold switch to move the hold valve between the first position to the second position.

23. The system of claim 22, wherein the hold switch comprises a ball valve and a handle to control the ball valve.

24. A system for controlling a parking brake comprising:
a pipe bracket comprising a brake pipe port and a reservoir port;
a parking brake control module configured to use pneumatic logic to control the parking brake;
a brake pipe passageway running from the brake pipe port to the parking brake control module;
a reservoir passageway running from the reservoir port to the parking brake control module;
a parking brake in fluid communication with the parking brake control module;
an exhaust in fluid communication with a parking brake cylinder of the parking brake to allow a parking brake pressure to escape to the atmosphere to apply the parking brake; and
a timing volume located between the parking brake and the exhaust to delay the pressure decrease at the parking brake when the parking brake pressure is released through the exhaust.

25. The system of claim 24, wherein the reservoir port is an auxiliary reservoir port, a supply reservoir port, or an emergency reservoir port.

* * * * *